(12) United States Patent
Ohba

(10) Patent No.: US 6,172,838 B1
(45) Date of Patent: Jan. 9, 2001

(54) DISK UNIT CREATING A POSITION SENSITIVITY CORRECTION VALUE USING POSITIVE AND NEGATIVE CROSS POINTS VALUES OF TWO-PHASE SERVO SIGNALS

(75) Inventor: Kazuhide Ohba, Higashine (JP)

(73) Assignee: Fujitsu Limited, Kawasaki (JP)

( * ) Notice: Under 35 U.S.C. 154(b), the term of this patent shall be extended for 0 days.

(21) Appl. No.: 09/318,110

(22) Filed: May 24, 1999

Related U.S. Application Data

(62) Division of application No. 08/694,674, filed on Aug. 9, 1996, now Pat. No. 5,978,167.

(30) Foreign Application Priority Data

Oct. 31, 1995 (JP) .................................................. 7-283574

(51) Int. Cl.⁷ .................................................. G11B 5/596
(52) U.S. Cl. .......................................... 360/77.04; 360/50
(58) Field of Search ........................... 360/51, 62, 77.04, 360/46, 50

(56) References Cited

U.S. PATENT DOCUMENTS

| | | | |
|---|---|---|---|
| 4,327,408 | * 4/1982 | Frissel et al. | 364/200 |
| 4,551,776 | 11/1985 | Roalson . | |
| 4,669,004 | 5/1987 | Moon et al. . | |
| 4,783,705 | 11/1988 | Moon et al. . | |
| 4,969,056 | * 11/1990 | Negishi et al. | 360/66 |
| 5,195,067 | 3/1993 | Yanagi . | |
| 5,233,486 | 8/1993 | Albert . | |
| 5,245,595 | 9/1993 | Yasukawa . | |
| 5,274,510 | 12/1993 | Sugita et al. . | |
| 5,384,671 | 1/1995 | Fisher . | |
| 5,517,371 | * 5/1996 | Takei | 360/50 X |
| 5,541,785 | 7/1996 | Sasamoto et al. . | |
| 5,587,850 | 12/1996 | Ton-that . | |
| 5,600,506 | 2/1997 | Baum et al. . | |
| 5,602,693 | 2/1997 | Brunnett et al. . | |

FOREIGN PATENT DOCUMENTS

| | | |
|---|---|---|
| 61-9876 | 1/1986 | (JP) . |
| 63-55787 | 3/1988 | (JP) . |
| 1223677 | 9/1989 | (JP) . |
| 2236887 | 9/1990 | (JP) . |
| 2306471 | 12/1990 | (JP) . |
| 3176872 | 7/1991 | (JP) . |
| 3237667 | 10/1991 | (JP) . |
| 485765 | 3/1992 | (JP) . |
| 4134679 | 5/1992 | (JP) . |
| 4157668 | 5/1992 | (JP) . |
| 4232676 | 8/1992 | (JP) . |
| 5210926 | 8/1992 | (JP) . |
| 512805 | 1/1993 | (JP) . |
| 5210926 | 8/1993 | (JP) . |
| 5225725 | 9/1993 | (JP) . |
| 5225731 | 9/1993 | (JP) . |
| 5234288 | 9/1993 | (JP) . |
| 5258547 | 11/1993 | (JP) . |
| 5303834 | 11/1993 | (JP) . |
| 6084515 | 2/1994 | (JP) . |
| 696542 | 4/1994 | (JP) . |
| 6187688 | 7/1994 | (JP) . |
| 6223389 | 12/1994 | (JP) . |

\* cited by examiner

*Primary Examiner*—John W. Cabeca
*Assistant Examiner*—K. Wong
(74) *Attorney, Agent, or Firm*—Greer, Burns & Crain, Ltd.

(57) ABSTRACT

An actuator is provided with a step so as to allow FPC mounting surfaces of a read/write FPC band and of a relay FPC to be level with each other. Pointer information P4 in a ROM table is used to refer to a RAM table to acquire offset correction data.

On-track control is effected at a cross point of two-phase servo signals N and Q. A value of this cross point is measured to find a position sensitivity correction value. A gap corresponding to encode loss is provided at the trailing position of each of sectors. In read operation, a sector pulse is generated with a delay corresponding to decode loss.

2 Claims, 19 Drawing Sheets

F I G. 4
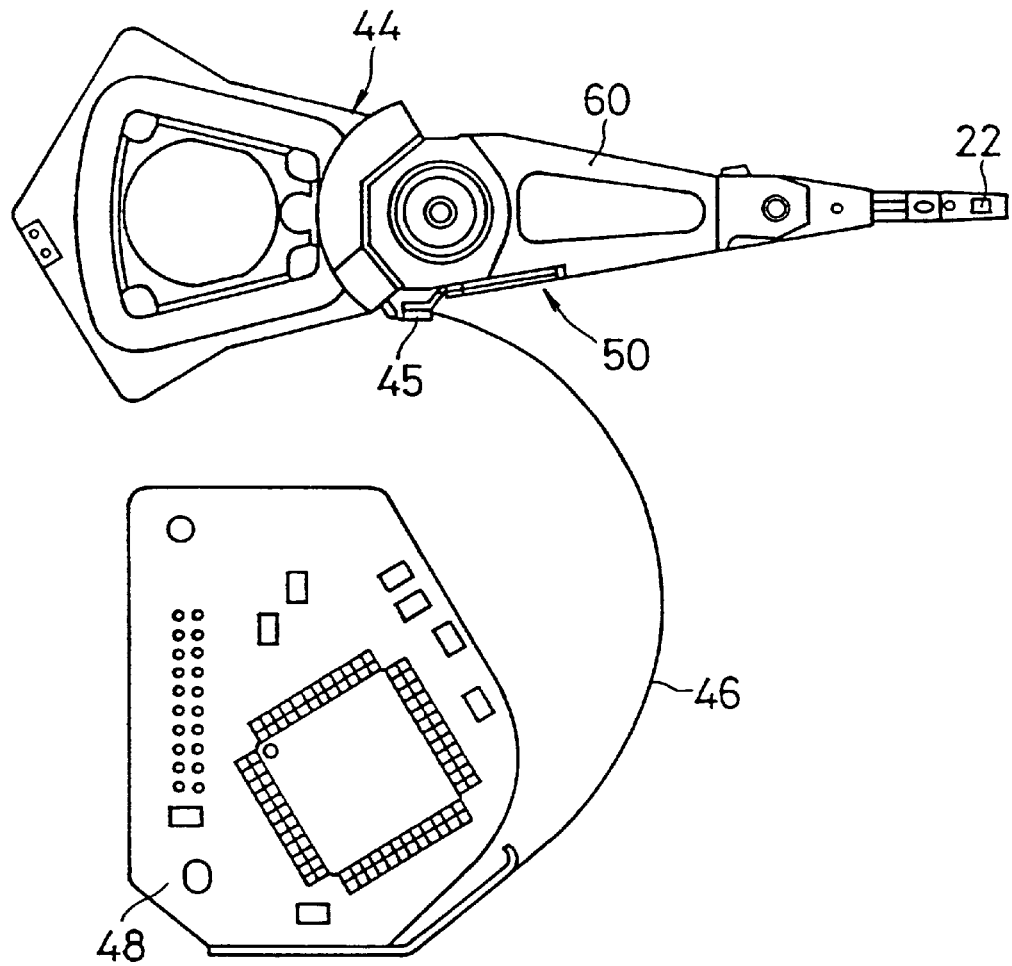
F I G. 5
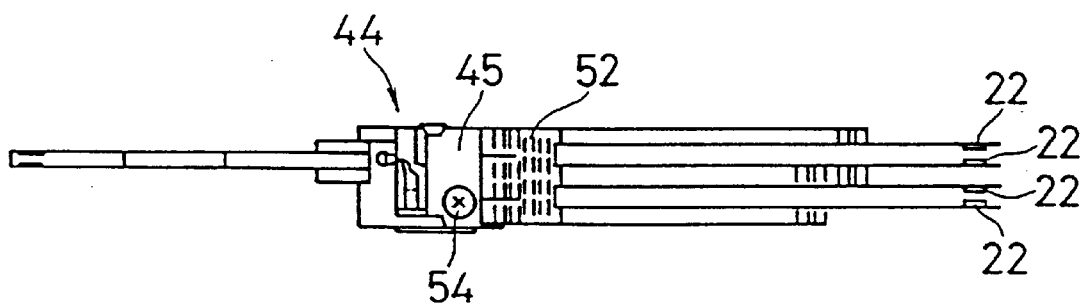

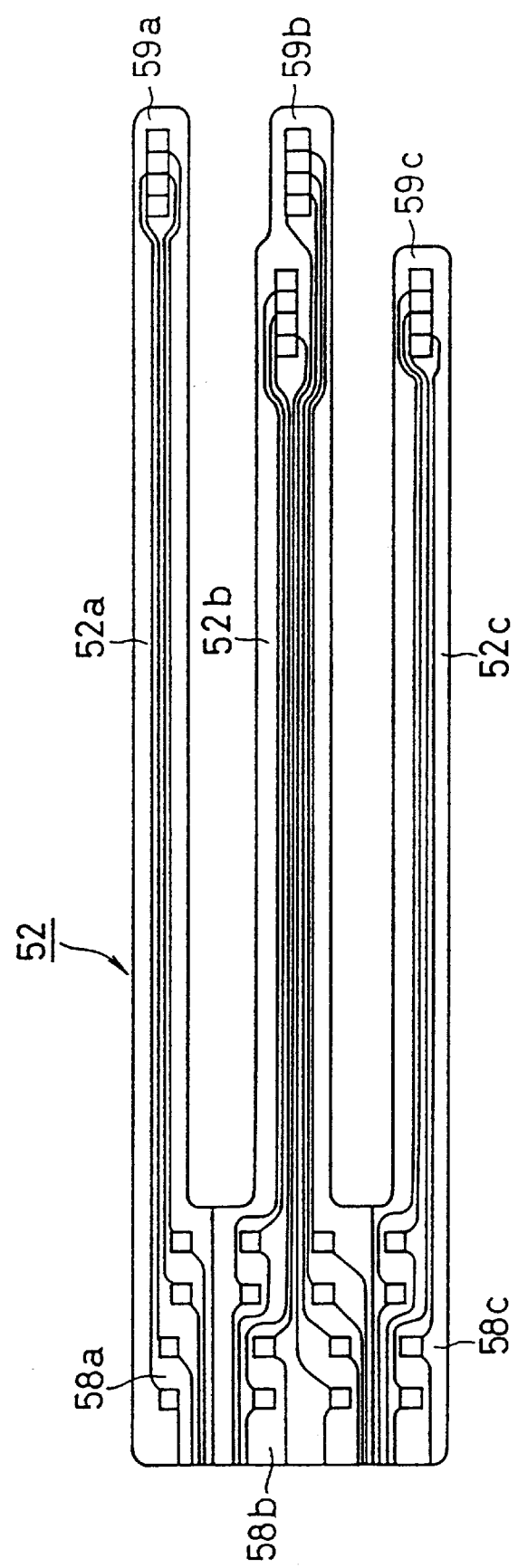

FIG. 17

| CONDITIONS FOR SIGNALS N, Q | ARITHMETIC EXPRESSION |
|---|---|
| N≦0, Q≦0 | N−Q |
| N≦0, Q>0 | −N−Q |
| N>0, Q≦0 | N+Q |
| N>0, Q>0 | N+Q |

FIG. 18

| | CONDITIONS FOR SIGNALS N, Q | OFFSET VALUE | |
|---|---|---|---|
| FIRST OFFSET TABLE | N≦0, Q>0 | − (1/6) TP | ⎫ |
| | N>0, Q≦0 | + (1/6) TP | ⎬ ~90 |
| | N>0, Q>0 | 0 | ⎭ |
| SECOND OFFSET TABLE | N≦0, Q>0 | + (1/6) TP | ⎫ |
| | N>0, Q≦0 | − (1/6) TP | ⎬ ~92 |
| | N≦0, Q≦0 | 0 | ⎭ |

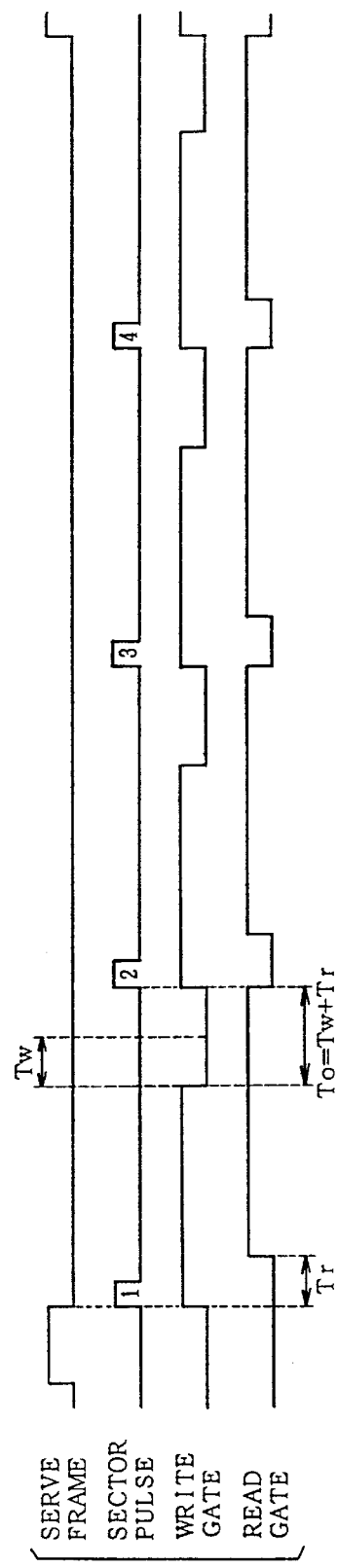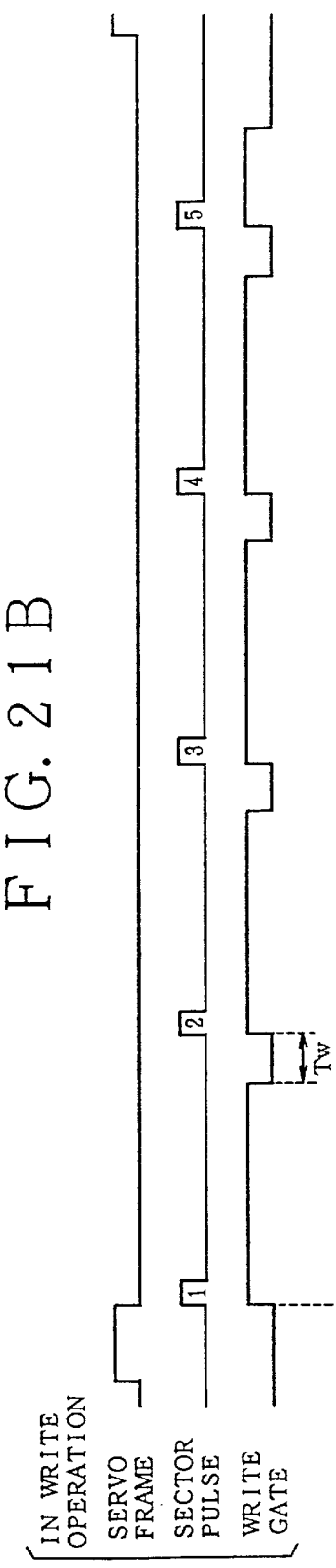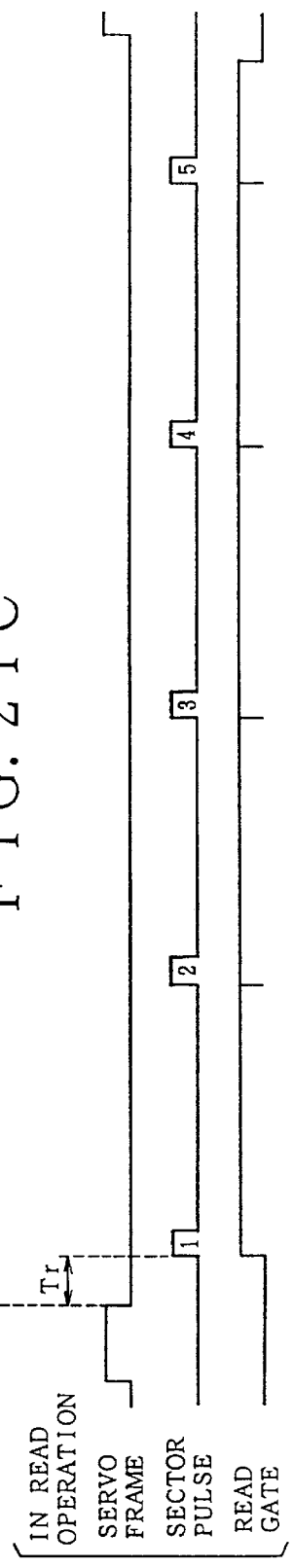

DISK UNIT CREATING A POSITION SENSITIVITY CORRECTION VALUE USING POSITIVE AND NEGATIVE CROSS POINTS VALUES OF TWO-PHASE SERVO SIGNALS

This is a divisional of application Ser. No. 08/694,674, filed Aug. 9, 1996 now U.S. Pat. No. 5,978,167.

BACKGROUND OF THE INVENTION

1. Field of the Invention

The present invention relates generally to an improved small-sized disk unit, and more particularly to a connection structure by means of FPC's (flexible printed circuits) between a head and an IC, a RAM storage of various types of offset correction values, position sensitivity measurement processing and a small-sized disk unit which generates sector pulses allowing for encode loss in write operation and decode loss in read operation.

2. Description of the Related Art

With a recent remarkable reduction in cost of magnetic disk units, cost-effective production and assembly are also pressingly desired. In conventional techniques, connection is made as follows between a head IC mounted FPC which is disposed on a base and a head which is supported at the distal end of a head actuator. A flexible read/write FPC band is extended from the head IC mounted FPC. A relay FPC extending from the head on the other hand is adhesively joined to the lateral surface of a head arm of the actuator. Land areas with terminal patterns of the two FPC's are fixedly joined together in a superposed manner on the lateral surface of the head arm. In the conventional FPC attachment structure, however, since the terminal ends of two FPC's are electrically and mechanically connected together in a superposed manner on a flat mounting surface of the head arm, the land area of the FPC on one hand is adhered securely to the mounting surface whereas the land area of the FPC on the other is superposed thereon in a raised state relative to the mounting surface. In this manner, connection surfaces of the two FPC's do not lie in the same plane, which may subject the land areas to a positional offset upon the superposition, thus necessitating a high-precision positioning and increasing the number of working steps. This may preclude a sufficient curtailment in production and assembly costs.

It is also anticipated that the magnetic disk unit may be used in a place subjected to an extreme variation in environmental temperature and humidity, and hence various types of head position corrections are effected in order to ensure a normal operation. In this case, closer positions of cylinders subjected to such head corrections will lead to a higher precision correction. In order to provide a closer cylinder positions to secure a higher precision correction, however, the capacity of the RAM for storing correction values therein must be larger, which will prevent the costs from being lowered. It is thus desired to provide a correction capable of reducing the use capacity of the RAM without impairing the precision of correction. In the conventional magnetic disk unit, the entire cylinder range of a disk medium is divided into a plurality of zones at equal intervals, and-correction values at zone boundaries are measured and stored in the memory. Correction values for arbitrary positions within a zone whose correction values have not been measured and stored are found by means of a linear interpolation from the correction values at opposite zone boundaries which have been stored. However, the correction values for the cylinder positions may often present non-linear characteristics. In the case of dividing into a plurality of zones at equal intervals, the zone intervals must be closer in order to ensure an accurate measurement of the non-linear portion. This will result in closer zone intervals in the linear portion and hence an increase in capacity of the memory for storing the measured correction values, thus bringing about an increase in costs. For the realization of cost-cut, in recent years in particular, a reduced capacity RAM is used as an internal memory of an MCU for use in a disk controller. This has a smaller RAM area available for the storage of the correction values. Efficient storage of the correction values is thus desired.

On the contrary, recent magnetic disk units tend to employ a closer track pitch with the reduction in size and increase in capacity, and hence the improvement in on-track precision is desired. Also, due to the employment of an MR head having a small core width as the read head in contrast with the write head using an inductive head, a core offset correction is inevitable between the write head and the read head. Thus, a phase variation position may become an on-track position. For this reason, in place of the conventional phase variation of two-phase servo pattern at a half track pitch, two-phase servo information is proposed in which the phase varies at one-third pitch. In order to effect the measurement of position sensitivity correction values in the conventional disk unit, it is necessary to measure a cross point of the two-phase servo signals N and Q. It is however impossible to directly measure the cross point since the servo signals N and Q are discretely obtained for each of sample cycles. A value of the cross point has thus been determined by means of a linear interpolation from values anterior and posterior to crossing the cross point of the two-phase servo signals N and Q which can be obtained when performing an equal-speed seek. An error may therefore be involved therein. In the case of the two-phase servo signals in which the track pitch is reduced to allow the phase to vary at one-third track pitch, two cross points appear during one track displacement. This means that the cross point density is doubled as compared with the case of a half track pitch. Thus, too much time is disadvantageously required for the measurement of the position sensitivity correction values, and it was difficult to expect to improve the measurement precision due to the linear interpolation.

To implement a size reduction and capacity increase of the disk unit, miniaturization of the disk size is advanced with the employment of disk high density recording for the increase in capacity. Also, for the read and write signal processing system, a partial response most likelihood (PRML) method is employed to heighten the function. With such heightening of function of the signal processing system, encode and decode time loss which could have been neglected for the conventional 1-7RLL, etc. tends to be increased. In the 1-7RLL for example, it was merely of the order of five bits. However, the partial response most likelihood method based signal processing entails as much as 44-bit loss, which is about ten times the former loss. A gap region for accommodating the loss must be provided and hence the format efficiency may be lowered. In the case of a conventional format allowing for both the encode loss and decode loss, in particular, the format efficiency will be remarkably lowered since it is provided with a gap region corresponding to the sum of the encode loss and the decode loss, the encode loss meaning an elongation of time taken in write operation after the completion of NRZ data input until the completion of write into the disk medium, the decode loss meaning an elongation of time taken in read operation after the acquisition of read signal until the actual NRZ data demodulation output.

SUMMARY OF THE INVENTION

According to a first aspect of the present invention, there is provided a disk unit having a structure ensuring an easy positioning, on a mounting surface of an actuator, of a base-side read/write FPC and a head-side relay FPC. More specifically, on the FPC mounting surface of the head actuator, a land area with a connection pattern of a read/write FPC band extending from a base-side FPC is superposed fixedly for connection on a land area with a connection pattern of a relay FPC attached to the head. In this case, an FPC mounting surface of the head actuator is formed with a recessed step on the read/write FPC band side, and in a state where the land area of the read/write FPC has been disposed in the recessed portion of this step so as to be level with the FPC mounting surface of the head actuator, the read/write FPC band land area is superposed fixedly for connection on the relay FPC land area. The read/write FPC band is received in the step formed in the FPC mounting surface, together with an underlying retainer serving as a support member. According to this FPC attachment structure, the recessed step accommodates the thickness of the read/write FPC band and the retainer as the support member, allowing the land areas of the read/write FPC band and the relay FPC to rest on the same plane, thus eliminating any step on a connection plane. As a result, there is no step between the two FPC land areas which are joined together in a superposed manner, ensuring an easy positioning work and improved positioning accuracy.

According to a second aspect of the present invention, there is provided a disk unit capable of arbitrarily varying the intervals of zones which store and hold measured correction values and minimizing the use capacity of the RAM which stores zone correction values. The object of the present invention is a disk unit which detects a head position on the basis of servo information stored on a disk medium and corrects for control the head position using predetermined offset correction data which have been defined in advance for each head position. In the present invention, such a disk unit is provided with a ROM table having a plurality of memory areas for storing therein pointer information which are allocated to a plurality of zones obtained by dividing a storage area of the disk medium, and a RAM table whose one or more memory areas are designated by each pointer information of ROM table and store offset correction data of a head position corresponding to each pointer information. The offset correction data generation unit finds pointer information through a reference to the ROM table, on the basis of a zone derived from a current head position X relative to the disk medium, refers to the RAM table using this pointer information to aquire offset correction data, and generates offset correction data at a current head position X through an interpolating calculation of the thus acquired offset correction data. Herein, the ROM table includes a plurality of memory areas corresponding to a plurality of equally divided zones, and the zones having the same offset correction data store the same pointer information, allowing an aquisition of the same pointer designated offset generation data stored in the RAM table. The RAM table stores offset correction data for one boundary position of each of a plurality of zones obtained by division. In this case, if the current head position lies in for example a zone Zi, then the offset correction data generation unit acquires first offset data G2 at one zone boundary position through a zone Zi based reference to the ROM table and RAM table. Then, the value of the zone for use in a reference to the ROM table is incremented by one into Zi+1. The offset correction data generation unit acquires second offset correction data at the other boundary position through a zone Zi+1 based reference to the ROM table and RAM table, and calculates by means of linear interpolation the offset correction data at a current head position on the basis of the first and second offset correction data, zone intervals and the current head position.

The offset correction data stored in the RAM table can be

I. External force offset correction data for correcting a mechanical external force applied to the head actuator;

II. Position sensitivity correction data, which are used when transforming head position data generated from a read signal of servo information recorded on a disk medium, into a theoretically correct head position data;

III. BL correction data for correcting the effect of BL (product of magnetic flux B and coil length L) depending on a magnetic force of a motor for driving the actuator.

The ROM table and the RAM table comprise a ROM element and a RAM element, respectively, incorporated in a micro control unit of a disk controller. Servo information recorded on the disk medium comprises a servo surface servo in which servo information is recorded on an exclusive disk surface, or a data surface servo in which servo information is recorded in an embedded manner within each sector of data surface. It is thus possible to vary the intervals for correction and to minimize the use area of the RAM, by using the pointer information of the ROM table so as to allow an arbitrary designation of a storage position in the RAM table which stores therein the correction data.

According to a third aspect of the present invention, there is provided a disk unit intended to transform, using position sensitivity correction values which have been measured in advance, two-phase servo signals N and Q detected from a read signal of two-phase servo information recorded on a disk surface, into correct head position information. To this end, in the disk unit of the present invention, the disk medium has a disk surface on which the two-phase servo information is recorded in such a manner that the phase varies at one-third cylinder pitch. The position sensitivity measurement unit executes, when measuring the position sensitivity correction value, on-track control at a cross point of two-phase servo signals N and Q derived from the servo information, and measures a value of the cross point to obtain a position sensitivity correction value. Herein, the position sensitivity measurement unit finds a measurement value at a position of the cross point on positive side and a measurement value at a position of the cross point on negative side two tracks apart therefrom, and calculates the position sensitivity correction value in the form of a mean value of absolute values of the two measurement values. This will relax asymmetry in the vertical direction of read waveforms of the MR head. The position sensitivity measurement unit calculates, as a position sensitivity correction value, a correction coefficient for correcting the cross point measurement value into a theoretical value. The position sensitivity measurement unit divides a recording area into a plurality of zones, and measures and stores a position sensitivity correction value for each of zone boundary positions, and upon a head position control, finds a position sensitivity correction value for a current position, through a linear interpolation, from position sensitivity correction values at two boundary positions of a zone in which a head is located.

According to a fourth aspect of the present invention, there is provided a disk unit capable of improving lowering of format efficiency attributable to encode loss and decode loss. The disk unit records a sector mark at a leading position of each of a plurality of sectors which are obtained by dividing tracks of a disk medium, and upon read operation or write operation relative to the disk medium, generates a write gate signal or a read gate signal on the basis of a sector pulse derived from a read of the sector mark. In order to improve lowering of the format efficiency caused by the encode loss and decode loss, the disk unit of the present invention comprises a gap region provided at the trailing position of each sector of the disk medium and having a duration corresponding to encode loss attributable to a write operation. The write gate generation unit generates in write operation a write gate signal in synchronism with the sector pulse, and stops the write gate signal in response to a detection signal of the gap region. The read gate generation unit generates in read operation a read gate signal in synchronism with a sector pulse with a delay of time corresponding to decode loss attributable to a read operation, and stops the read gate signal in response to a signal which is obtained by delaying the detection signal of the gap region by the time corresponding to decode loss. For this reason, a gap region corresponding to only the encode loss in write operation will suffice for the gap region of each sector. Thus, as compared with the conventional case of providing a gap region corresponding to the sum of the encode loss and decode loss, lowering of format efficiency can be improved with the increased disk capacity. The encode loss and decode loss vary depending on the cylinder positions, and the gap region having a duration corresponding to encode loss and the delay time corresponding to decode loss are each to be set to a value depending on a cylinder position of the head, for example, a value defined on a zone-by-zone basis.

The above and other objects, features, and advantages of the present invention will become more apparent from the following detailed description with reference to the accompanying drawings.

BRIEF DESCRIPTION OF THE DRAWINGS

FIG. 4 is an explanatory diagram of an actuator associated with an FPC;

FIG. 5 is a side elevational view of the actuator of FIG. 4, showing the FPC mounting surface side thereof;

FIG. 7 is an explanatory diagram of a relay FPC of FIG. 5;

FIG. 17 is an explanatory diagram of a condition table for use in the calculation of head position signals at cross point measurement cylinder positions of FIG. 16C;

FIG. 18 is an explanatory diagram of offset tables for use in joining the cross point head position signals of FIG. 16C;

FIGS. 21A to 21C are time charts showing generation of read gate and write gate signals by FIG. 20 arrangement in comparison with prior art.

DETAILED DESCRIPTION OF THE PREFERRED EMBODIMENTS

General Structure

Figure 1:
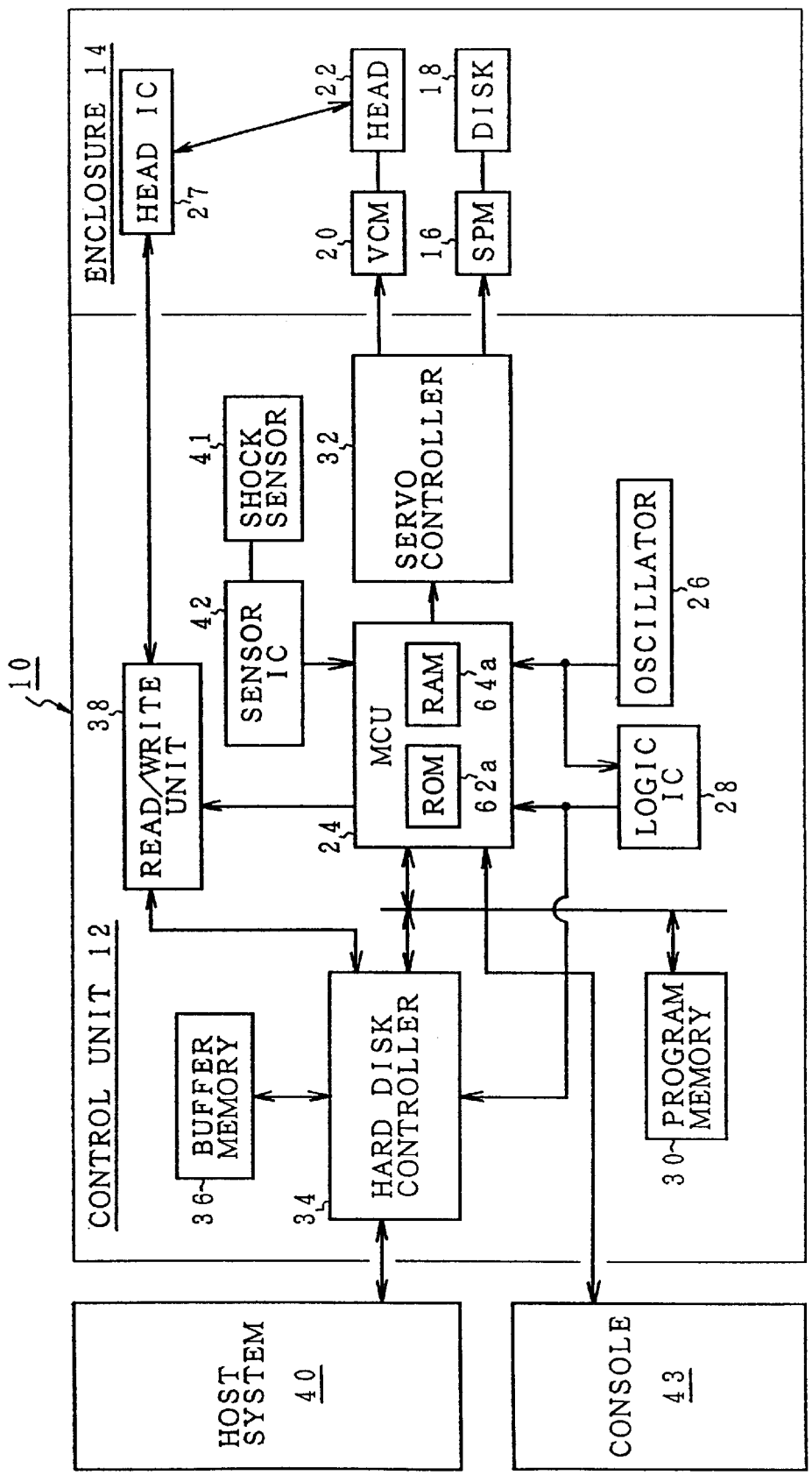
FIG. 1 is a block diagram showing a general configuration of the present invention.

Referring to FIG. 1 there is depicted a block diagram illustrating a general circuit configuration of a disk unit according to the present invention. The disk unit of the present invention is in the form of a disk drive which is generally designated at 10 and comprises a control unit 12 and an enclosure 14. The enclosure 14 includes at least one disk medium 18 serving as a storage medium and rotated by a spindle motor 16. In this embodiment, use is made of for example two 2.5-inch magnetic disks. The enclosure 14 also includes a voice coil motor 20 (hereinafter referred to simply as VCM) for driving a head actuator so as to allow a positioning of a head 22 relative to a data surface of the disk medium 18. Four heads 22 are provided in this embodiment since the two disk media 18 present a total of four data surfaces. The enclosure 14 further includes a head IC 27 which is associated with the control unit 12 to perform for each head 22 a read/write, a servo-information reading, a head switching, etc. The control unit 12 includes an MCU (micro control unit) 24. The MCU 24 incorporates therein a ROM 62a and a RAM 64a as well as a CPU. The ROM 62a and the RAM 64a may be incorporated within the MCU 24 as described above, or alternately may be externally provided. Associated with the MCU 24 are an oscillator 26 for producing a predetermined clock; a logic IC 28 for generating a clock necessary for various types of control on the basis of the clock from the oscillator 26; a program memory 30 serving as an external ROM; a servo controller 32 for controlling the spindle motor 16 and VCM 20 in the enclosure 14; a hard disk controller 34 which is associated with a host system 40 to perform therebetween a transfer of various types of commands and data necessary for input/output; a buffer memory 36; and a read/write unit 38 intended to carry out a read/write for the disk media 18. In addition to these, the disk drive 10 of the present invention comprises a shock sensor 41 whose detection signal is processed by a sensor IC 42 and imparted to the MCU 24. The shock sensor 41 can be for example a piezoelectric element, which is operable to output a shock detection signal to the MCU when an acceleration in a predetermined direction caused by an external shock exceeds a normal value in the sensor IC 42. If writing action for the disk medium 18 is now being performed, the thus issued shock detection signal will forcedly terminate that writing action. The piezoelectric element available for the shock sensor 41 has a directivity. In this embodiment, it is oriented so as to be able to detect a shock in a direction in which the head 12 turns, that is, in a direction traversing a track of the disk medium 18. A console 43 may also be provided, if necessary, externally of the disk drive 10 for allowing input to and output from the MCU 24 necessary for start-up or maintenance of the system.

Figure 2:
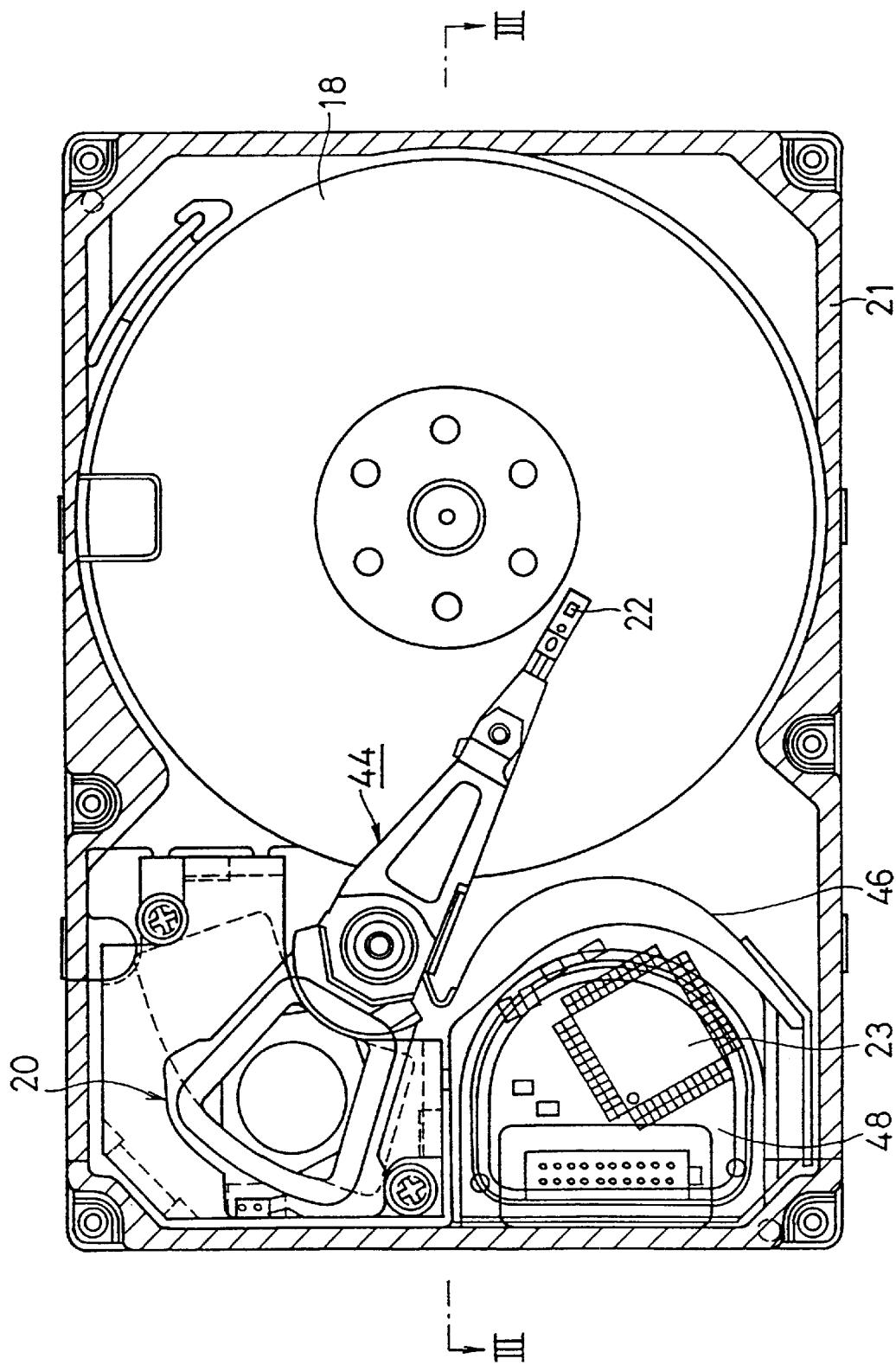
FIG. 2 is an explanatory diagram of a disk enclosure of FIG. 1.

Referring to FIG. 2 there is depicted an internal structure of the enclosure 14 in the disk drive 10 of FIG. 1. The disk medium 18 is mounted on a base 21 of the enclosure 14 and is rotated by the spindle motor 16 at a given speed. An actuator 44 is disposed at a corner of the base 21 for each disk medium 18 and is turned by the VCM 20 located at the posterior part thereof so as to allow the head 22 at its anterior end to be moved and positioned in a radial direction of the disk medium 18. A base-side FPC 48 is disposed in the vicinity of the actuator 44 and has a head IC 23 mounted thereon. A read/write FPC band 46 extends from the base-side FPC 48 and is supportingly secured to the actuator 44 at the lateral surface on the head 22 side.

Figure 3:
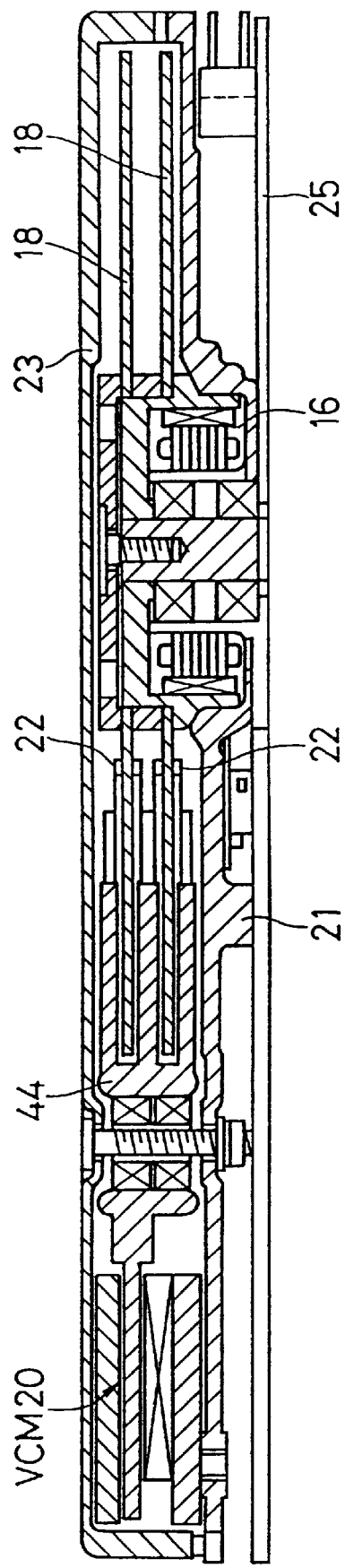
FIG. 3 is a sectional view taken along a line III—III of FIG. 2.

Referring to FIG. 3 there is depicted the enclosure 14 in cross section taken along a line III—III of FIG. 2. The actuator 44 is rotatably mounted on the base 21, with the VCM 20 being disposed posteriorly of the actuator 44. Three head arms are formed at the anterior end of the actuator 44, each head arm having the head 22 at its end. The two disk media 18 are coupled to a rotational part of the spindle motor 16 in such a manner that the four heads correspondingly confront the data surfaces on both sides of each disk medium 18. A cover 23 is fitted to the top of the base 21, and a printed circuit board 25 having the control unit 12 of FIG. 1 mounted thereon is fitted to the underside of the base 21.

FPC Attachment Structure

Referring to FIG. 4 there is depicted in particular the actuator 44 provided in the enclosure 14 of FIG. 2 together with the base-side FPC 48. The read/write FPC band 46 extends from the base-side FPC 48 and is clamped by a retainer 45 lying on the lateral side of a rotational shaft of the actuator 44. The leading part of the band 46 drawn out from the retainer 45 is connected in a superposing manner to a relay FPC which is fitted to the head 22 side by way of an FPC connection 50 of the head arm 60.

Referring to FIG. 5 there is depicted in side elevation the actuator 44 of FIG. 4 viewed from the FPC connection 50 side, in which the retainer 45 is fastened to the lateral surface of the actuator 44 by means of a screw 54. The thus fastened retainer 45 will ensure that the base-side FPC 48 is electrically and mechanically connected fixedly to the relay FPC 52 by superposing in the FPC connection 50 the leading end of the read/write FPC band 46 onto the terminal end of the relay FPC 52 fitted to the head 22 side.

Figure 6:
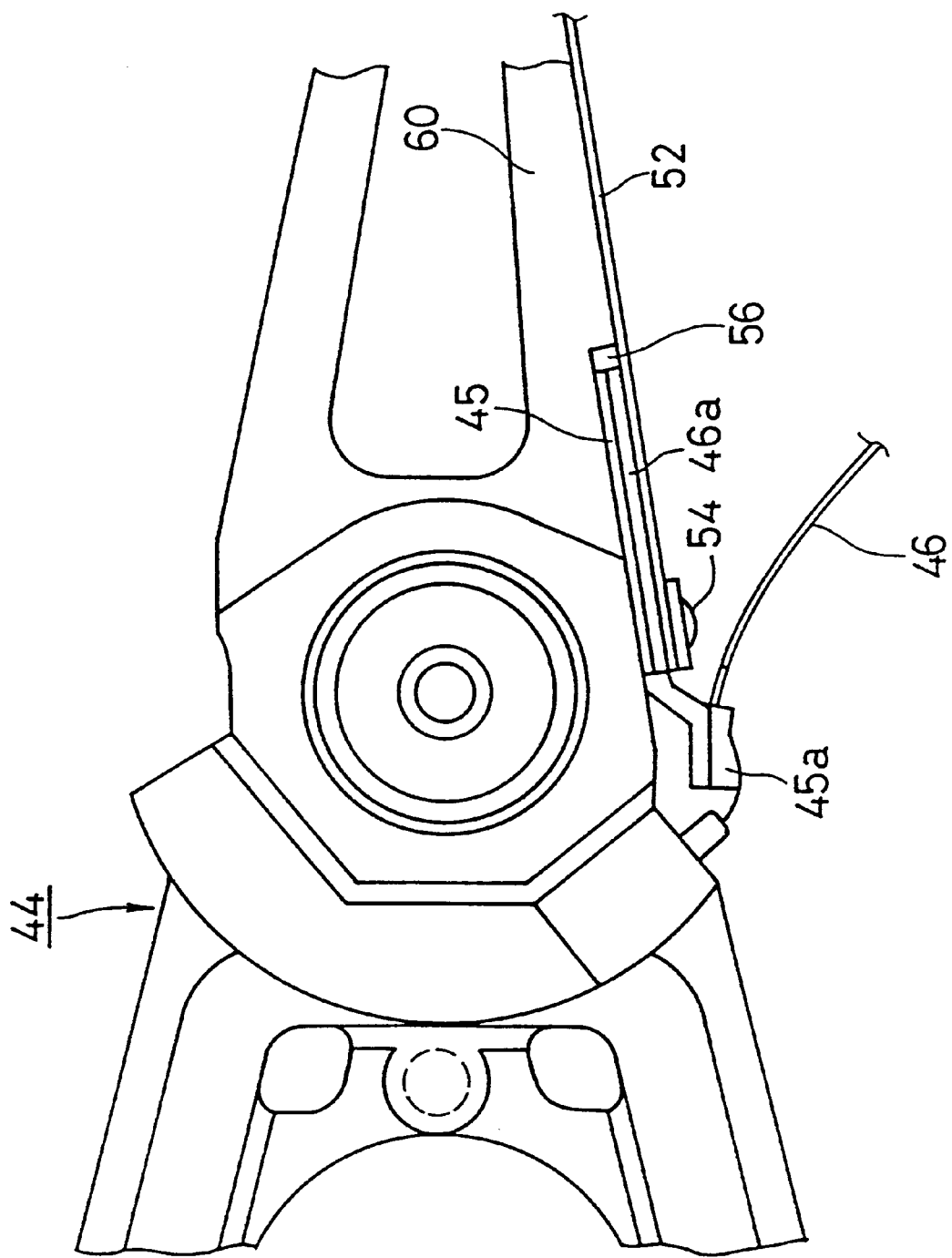
FIG. 6 is an enlarged view of an FPC attachment structure of FIG. 4.

Referring to FIG. 6 there is depicted the FPC connection 50 of FIG. 4 in an enlarged view. An FPC fitting surface is formed on the lateral surface of the head arm 60 of the actuator 44 and defines a step 56 which is recessed on the read/write FPC band 46 fitting side. Received within the step 56 is a free end 46a of the read/write FPC band 46 whose leading part has been fitted to the retainer 45. More specifically, the leading part of the read/write FPC band 46 is clamped by a clamp portion 45a of the retainer 45 and then is drawn out, allowing its free end 46a to be fitted to the step 56 formed on the lateral surface of the head arm 60 with the free end 46a being adhered to the retainer 45 by means of, for example, a double-coated tape. In such a state where the retainer 45 and the free end 46a of the read/write FPC band 46 have been fitted to the step 56, the surface of the read/write FPC band free end 46a, that is, a land area having connection patterns formed thereon is provided to lie within a plane coincident with the fitting surface to which the relay FPC 52 is adhesively fixed. The retainer 45 is threadedly fastened to the actuator 44 by means of a screw 54 in order to firmly connect in the step 56 the relay FPC 52 to the read/write FPC band free end 46a adhered to the retainer 45.

Referring to FIG. 7 there is depicted in particular the relay FPC 52 adhesively fixed to the lateral surface on the head side of the actuator 44 of FIG. 5 by means of for example a double coated tape. The relay FPC 52 includes three FPC sections 52a, 52b and 52c. The FPC sections 52a, 52b and 52c have land areas 58a, 58b, and 58c, respectively, on its connection side with the read/write FPC band 46, and have land areas 59a, 59b, and 59c, respectively, on its head side. The land areas 58a, 58b, 58c and 59a, 59b, 59c are each provided with rectangular connection patterns. In this embodiment, the head 18 is a combined head consisting of a write head using an inductive head and a read head using an MR head. For this reason, the land areas 59a, 59b and 59c are each provided with four rectangular connection patterns for four write head and read head pairs. Correspondingly to the four rectangular connection patterns, another set of four rectangular connection patterns is formed on each of the land areas 58a, 58b, and 58c in which connection with the read/write. FPC band is made in a superposed manner.

Figure 8A:
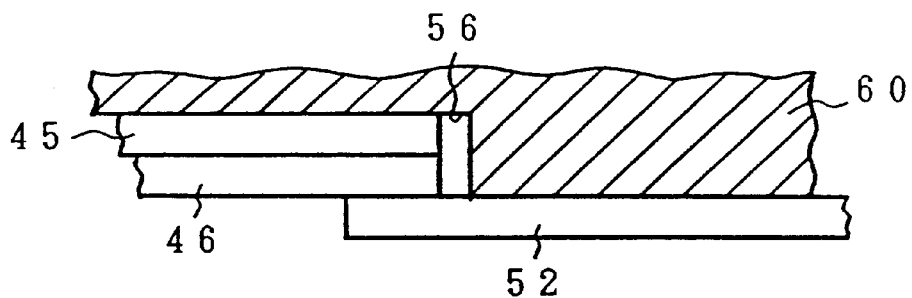
FIGS. 8A to 8D are explanatory diagrams showing the FPC attachment structure of the present invention in comparison with conventional structures.
Figure 8B:
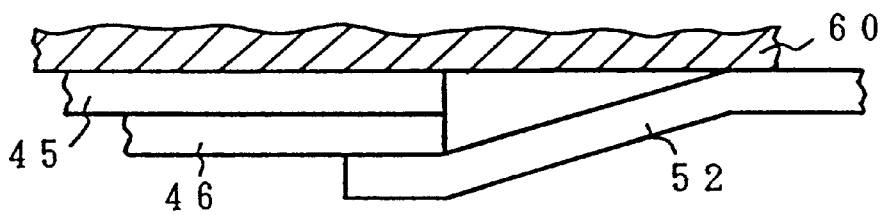
Figure 8C:
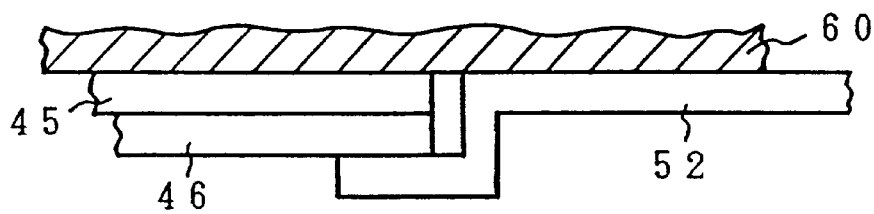
Figure 8D:
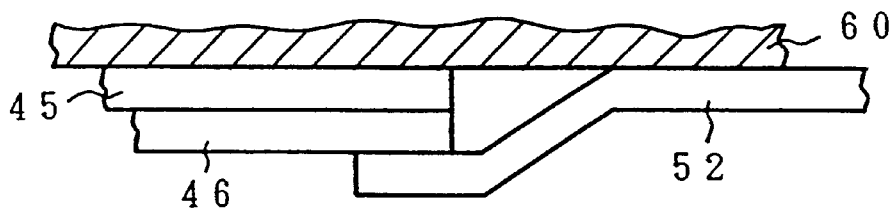

Referring to FIGS. 8A to 8D there is depicted the FIG. 6 FPC attachment structure according to the present invention in comparison with the conventional structures. FIG. 8A illustrates the FPC structure of the present invention, in which the fitting surface of the head arm 60 is provided with the step 56 for receiving therein the retainer 45 and the land area of the read/write FPC band 46 in a superposed manner so that the land area connection surface on the front side of the read/write FPC band 46 is allowed to lie within a plane coincident with the fitting surface 52a of the relay FPC 52 for the head arm 60. This will thus ensure that the connection surfaces at the terminal ends of the read/write FPC band 46 and the relay FPC 52 lie within the same plane. In the conventional structures, on the contrary, as shown in FIGS. 8B, 8C and 8D, the retainer 45 and the read/write FPC band 46 are superposed on a flat fitting surface of the head arm 60 and then the relay FPC 52 extending from the opposite side is laid up on the extremity of the read/write FPC band 46 with the extremity of the former raised in such a manner that their respective lands are aligned with and fixedly connected with one another. This may give rise to a positional offset in the lateral direction due to the raised land area at the extremity of the relay FPC 52, which will result in an offset between the design dimensions of the land area and the actual positioning dimensions thereof. As a result, the connection patterns of the lands 58a, 58b and 58c of FIG. 7 are offset relative to each other, resulting in a defective contact, which will need a high-precision positioning allowing a precise positioning of the rectangular connection patterns formed on the land areas. Such a problem is overcome in the FPC structure of the present invention shown in FIG. 8A.

Store of Offset Correction Values to RAM

Figure 9:
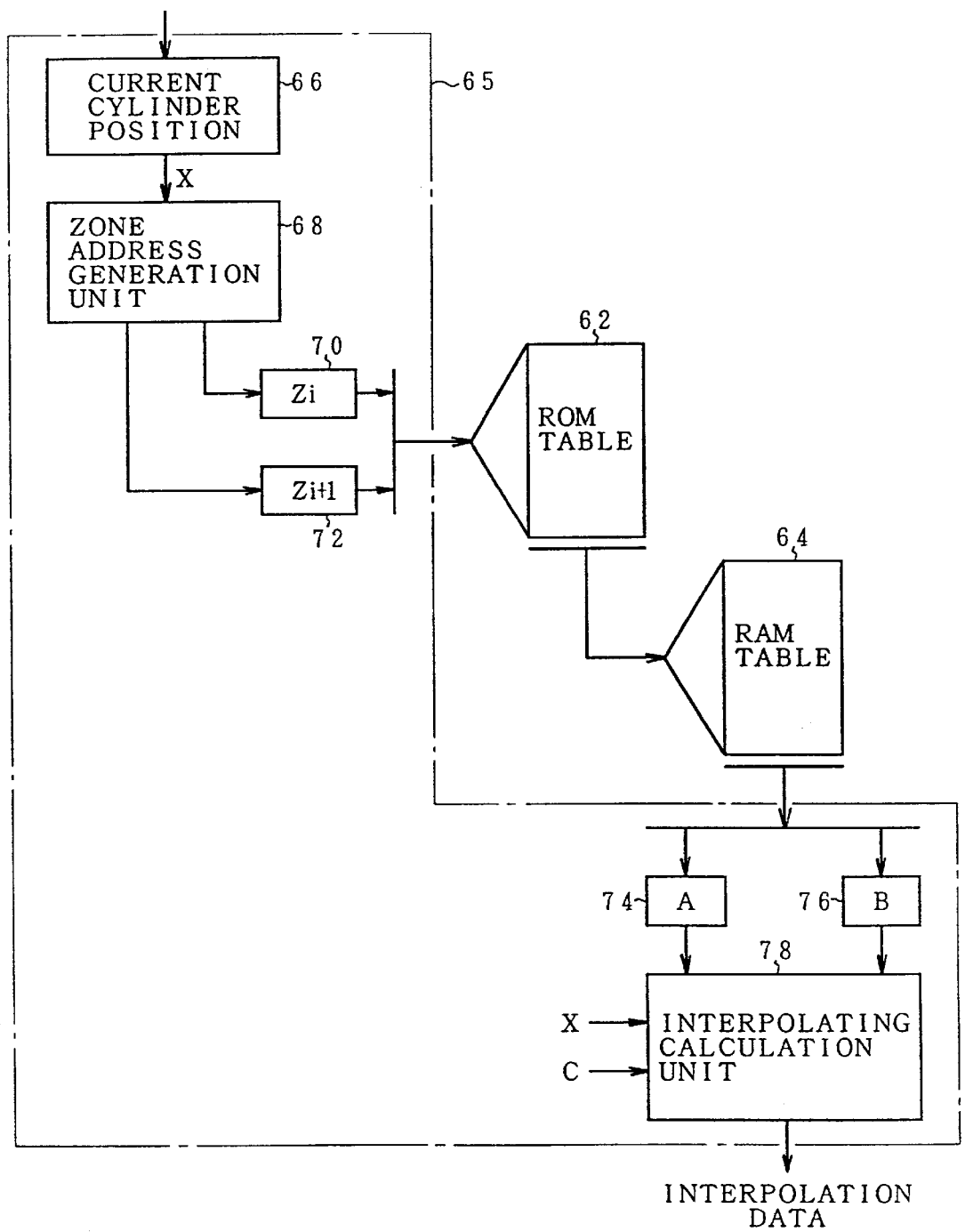
FIG. 9 is a functional block diagram showing offset correction data storage and interpolating generation of the present invention.

Referring to FIG. 9 there is depicted a functional block diagram illustrating storage and generation processing of offset correction data for use in head position offset correction to be performed by the MCU 24 placed in the control unit 12 of FIG. 1. A ROM table 62 and a RAM table 64 are used for the storage of the offset correction data. The ROM table 62 and the RAM table 64 comprise respectively a ROM element 62a and a RAM element 64a which are both incorporated within the MCU 24 of FIG. 1. It is to be appreciated that the disk drive 10 of the present invention employs for cost-cutting a less-capacity memory as the RAM incorporated in the MCU 24, resulting in a restricted region available for the store of the offset correction data. Effective use is thus made of the restricted RAM region to store the offset correction data.

Figure 10A:
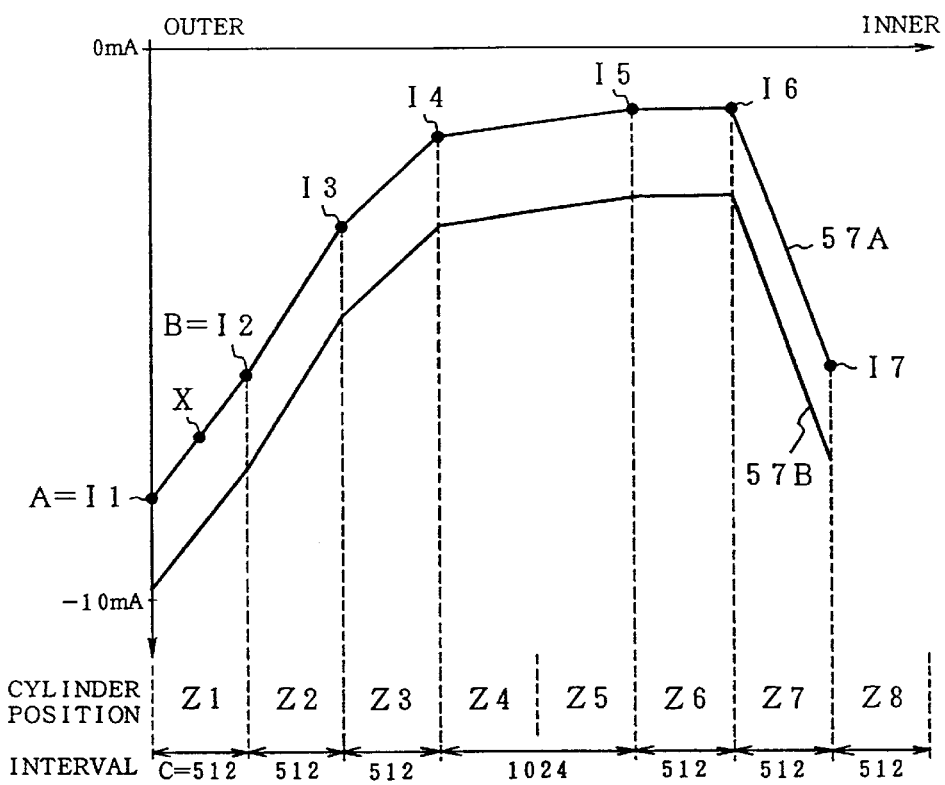
FIGS. 10A to 10C are explanatory diagrams of a ROM table and a RAM table of FIG. 9 in the case of external offset correction data.
Figure 10B:
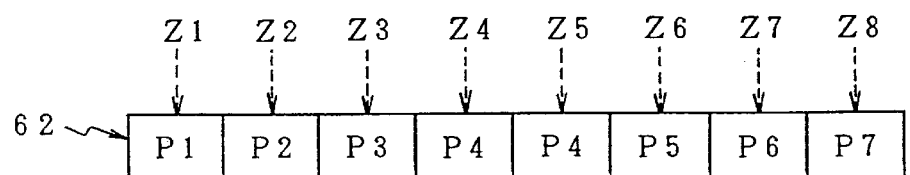
Figure 10C:
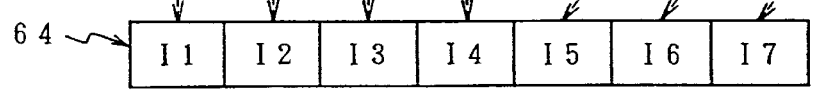

Referring to FIGS. 10A, 10B and 10C there are respectively depicted a zone-division measurement of offset correction data for correcting a mechanical biasing force to the disk media relative to a cylinder position, and an embodiment of the ROM table 62 and RAM table 64. FIG. 10A illustrates measurement values of an offset current to be applied to the VCM 20 in order to eliminate a mechanical external force to the two disk media 18 of FIG. 3 relative to a cylinder position. The disk medium 18 of the present invention has a storage area of 4096 cylinders which is first divided into eight zones Z1 to Z8 each including 512 cylinders. This mechanical biasing force depends on a deflection force of the relay FPC band 46 through which the base-side FPC 48 is connected to the actuator 44 as shown in FIG. 2. For this reason, both end zones on outer and inner sides tend to be subjected to an increased external force. To correct this, it is necessary to apply a larger offset current. In contrast, intermediate zones tend to be subjected to a stabilized external force, which will need for external force correction a relatively small offset current whose variation is substantially linear. With reference to FIG. 10A, consideration will be given of an external force offset characteristic 57A by way of example. The center zones Z4 and Z5 of the eight zones Z1 to Z8 present substantially no offset current variation which is linear. It is thus possible to regard these two zones as a single zone to obtain therefrom a single offset correction current value to be stored. In the graph, I1 to I7 represent offset correction current values of the offset characteristic 57A, which have been obtained from the measurement of the zones Z1 to Z8, respectively.

FIG. 10B illustrates the ROM table 62 including eight memory areas corresponding respectively to eight zones Z1 to Z8 of the cylinder positions. It is to be appreciated that the ROM element 62a incorporated within the MCU 24 of FIG. 1 has a sufficient storage capacity as compared with the RAM element 64a, and hence that the provision of a memory area for each of the zones Z1 to Z8 would cause no problem in terms of the capacity. The eight memory areas of the ROM table 62 respectively store pointer information P1 to P7 respectively indicating storage locations of the biasing force correction current I1 to I7 stored in the RAM table 64 of FIG. 10C. The same pointer information P4 is stored in both the zones Z4 and Z5 since these two zones are regarded as a single zone, thereby making it possible to use the pointer information P4 to refer to the biasing force correction current I4 stored in the fourth memory area of the RAM table 64. If it is desired to integrate a plurality of zones into a single zone in accordance with the offset data characteristics in the zones Z1 to Z8 in a radial direction of the cylinders, the same pointer information may be stored in the corresponding memory areas of the ROM table 62 so as to allow offset correction data in the same storage area of the RAM table 64 to be referred to. This will contribute to a reduction in the number of memory areas contained in the RAM table 64.

Referring again to FIG. 9 there is provided an offset correction data generation unit 65 associated with the ROM table 62 and the RAM table 64. The offset correction data generation unit 65 comprises a register 66 for setting therein a current cylinder position X detected from a head position signal, and a zone address generation unit 68 which first finds a zone $Z_i$ to which the current cylinder position X belongs for the load into a register 70 and then refers to the ROM table 62. The ROM table 62 stores pointer information as shown in FIG. 10B, which is read out to read corresponding offset correction data stored in the RAM table 64. The first read offset correction data A are placed in a register 74. Subsequently, the zone address generation unit 68 generates a $zone_{i+1}$ adjacent to the current zone $Z_i$ for the load into the register 72, the $zone_{i+1}$ being used to refer to the ROM 62 to obtain therefrom pointer information, which is in turn used to refer to the RAM table 64 to obtain therefrom corresponding offset correction data B for the storage into the register 76. More specifically, as is apparent from FIG. 10A, stored in the RAM 64 as the offset correction data I1 to I7 are biasing force correction current values which have been obtained from the measurement at for example left-hand boundary positions of the zones Z1 to Z8. Providing that the head lies at a current cylinder position X within the zone Z1 for example, pointer information P1 obtained from a reference to the ROM table 62 about the zone Z1 will merely provide, through a reference to the RAM table 64, offset correction data A=I1 at left-hand boundary position of the zone Z1. Then, through a second reference to the ROM table 62 about the adjacent zone Z2, pointer information P2 is obtained which is used to refer to the RAM table 64 to obtain offset correction data B=I2. The offset correction data A=I1 and B=I2 at opposite zone boundary positions of the zone Z1 are thus acquired for liner interpolation and stored in the registers 74 and 76, respectively. Then, an interpolating calculation unit 78 uses the current cylinder position X and an interval C of the zone Zi to calculate as interpolation data the offset correction data at the current cylinder position X. That is, an expression for calculating the interpolation data can be given as:

$$\text{Interpolation Data} = A + [\{(B-A)/C\} \times (X-A)]$$

Upon a seek control, for example, the interpolation data thus generated in the offset correction data generation unit 65 are flowed with an offset correction current for removing influence of an external force on the VCM, added to a velocity control current. During an on-track control, the thus obtained offset data are added to a position servo control loop based on the head position signal to thereby eliminate influence of an external force on the actuator.

Figure 11:
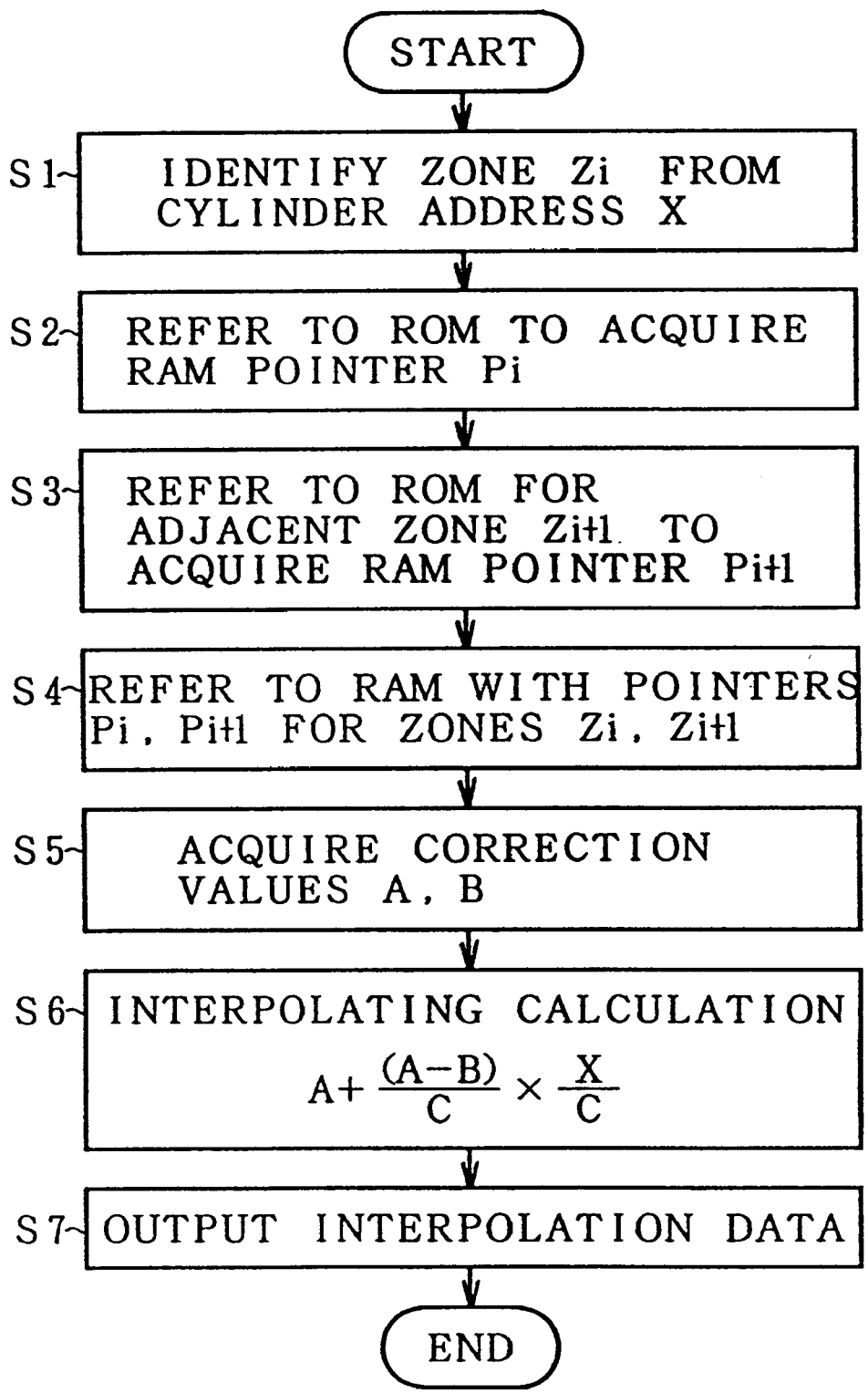
FIG. 11 is a flow chart showing offset correction data generation processing of FIG. 9.

Referring to FIG. 11 there is depicted a flow chart illustrating a processing action to be performed by the offset correction data generation unit 65 of FIG. 9. First, in step S1 a zone $Z_i$ is identified from a current cylinder position X and in step S2 the ROM table 62 is referred to for acquisition of pointer information $P_i$. Then, in step S3 the ROM table 62 is referred to for the adjacent zone $Z_{i+1}$ to acquire RAM pointer information $P_{i+1}$. Afterward, in step S4 the RAM table 64 is referred to using the pointer information $P_i$ and $P_{i+1}$ and in step S5 correction values A and B are acquired. Thereafter, in step S6 a linear interpolating calculation is performed to obtain a correction value for the current cylinder position and in step S7 the calculated interpolation data are provided as an output.

Figure 12A:
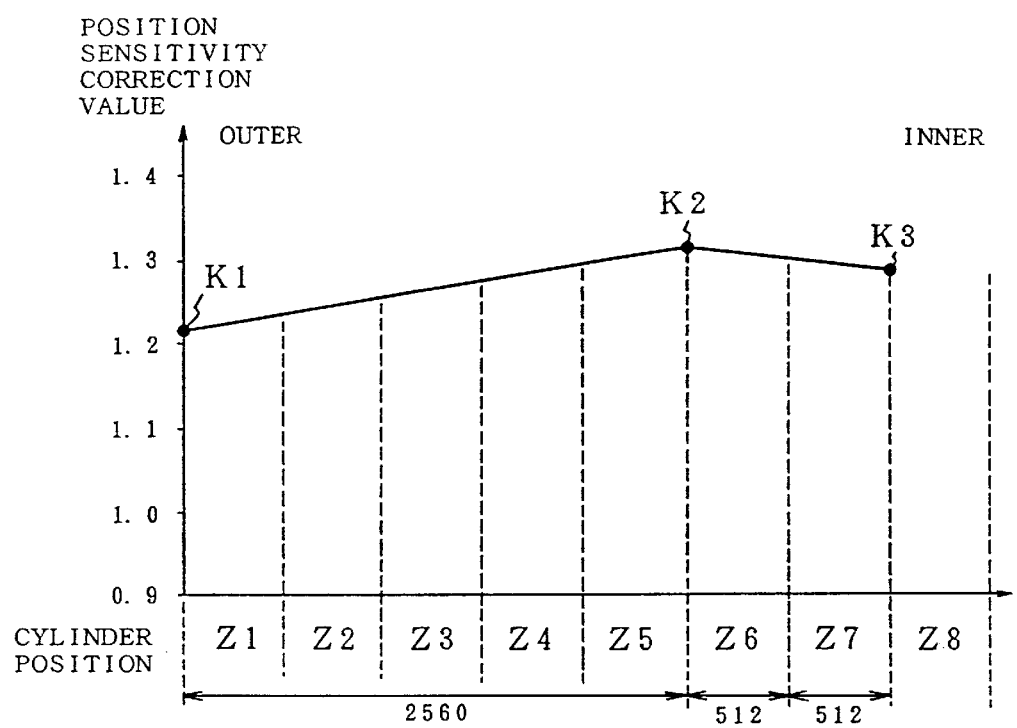
FIGS. 12A to 12C are explanatory diagrams of the ROM table and the RAM table of FIG. 9 in the case of position sensitivity correction data.
Figure 12B:
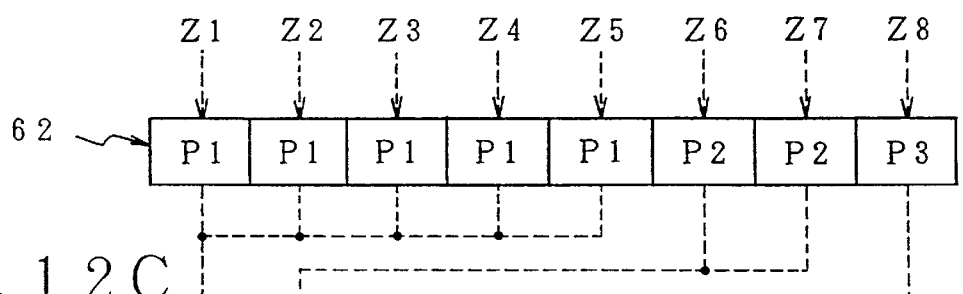
Figure 12C:
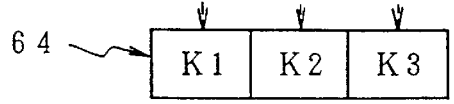

Referring to FIGS. 12A to 12C there are depicted for position sensitivity correction data the FIG. 9 embodiment based zone division and the contents of the ROM table 62 and the RAM table 64. FIG. 12A illustrates a position sensitivity correction value for a cylinder position. The position sensitivity correction value is represented as K and is a coefficient for transforming a head position read from servo information on a disk medium into a correct head position which is logically determined. The position sensitivity correction value K varies in a relatively gentle manner as shown in for example FIG. 12A. Thus, in FIG. 12A, cylinders are divided in a radial direction into eight zones Z1 to Z8 in the same manner as the case of the external force correction of FIG. 10, correspondingly to which a ROM table 62 is provided which has eight memory areas as shown in FIG. 12B. It can be seen from the graph with respect to characteristics of the position sensitivity correction value in the radial direction of cylinders that the position sensitivity correction value is linearly increased in the zones Z1 to Z5 whereas it is linearly decreased in the remaining zones Z6 and Z7. It is to be noted that the zone Z8 is a domain which is not available as a system zone to the user and hence a measurement value at a zone boundary is fixedly used for the zone Z8. The zones Z1 to Z5 are thus regarded integrally as a single zone. For this reason, the same pointer information P1 is stored in memory areas of the ROM table 62 of FIG. 12B corresponding to the zones Z1 to Z5. The pointer information P1 refers to a position sensitivity correction value K1 stored in a first memory area of the RAM table 64 of FIG. 12C. The zones Z6 and Z7 are then regarded as a single zone. The same pointer information P2 is stored in memory areas of the ROM table 62 corresponding to the zones Z6 and Z7, allowing the pointer information P2 to be used to refer to a position sensitivity correction value K2 which has been obtained by the measurement at a left-hand zone boundary position of the zone Z6 and stored in a second memory area of the RAM table 64. For the zone Z8, pointer information P3 is stored in the ROM table 62 and allows a reference to a position sensitivity correction value K3 stored in a third memory area of the RAM table 64. Thus, in the case of the position sensitivity correction value varying linearly in this manner, its linear portion is regarded as a single zone to thereby enable eight zones Z1 to Z8 in this example to be correlated with only three memory areas of the RAM table 64.

Figure 13A:
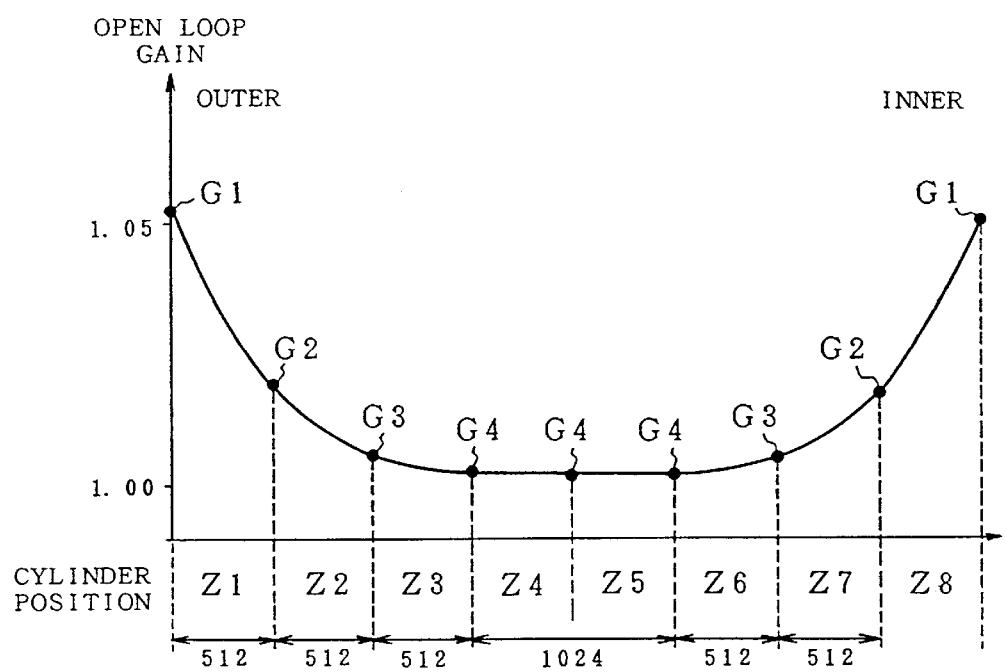
FIGS. 13A to 13C are explanatory diagram of the ROM table and the RAM table of FIG. 9 in the case of BL correction data.
Figure 13B:
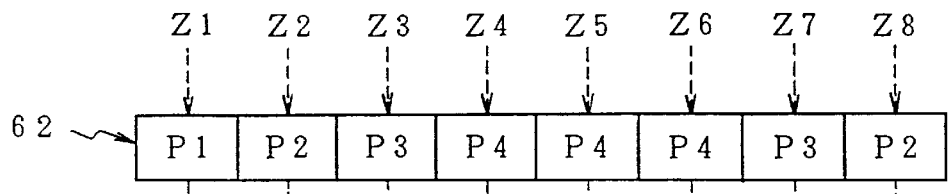
Figure 13C:
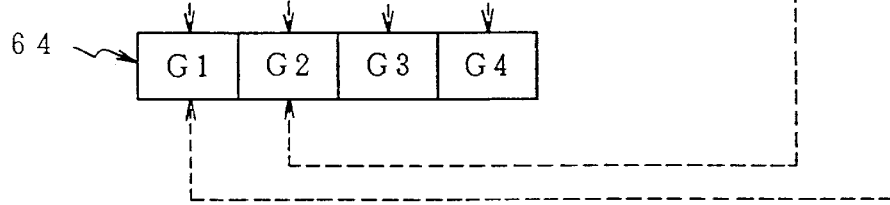

Referring to FIGS. 13A to 13C there are depicted a zone division and the contents of the ROM table 62 and the RAM table 64 in the case of BL correction data for correcting a variation, in the radial direction of cylinders, of a BL value of a permanent magnet used in the VCM, that is, a product of a magnetic flux B and a coil length L. FIG. 13A illustrates a correction characteristic of a biasing force offset acting on the cylinder positions. The biasing force offset is usually given as a measurement value of an open-loop gain G. The open-loop gain G representing a BL value based offset is large at cylinder positions on the inner and outer sides and is flat at intermediate portions with non-linearly varying transitions therebetween. The open-loop gain for correcting BL values is divided into eight zones Z1 to Z8, and a corresponding number of memory areas are provided in the ROM table 62. In this case, measurement values at respective boundaries of Z1 to Z8 are designated at G1, G2, G3 and G4, presenting a substantially symmetrical offset characteristic. Accordingly, three middle zones Z4, Z5 and Z6 are regarded as a single zone, and the same pointer information P4 is stored in corresponding memory areas of the ROM table 62, allowing the open-loop gain G4 of the RAM table 64 to be referred to. The zones Z3 and Z7 adjacent respectively to zones Z4 and Z6 are also considered to be symmetrical and the same pointer information P3 is stored in corresponding memory areas of the ROM table 62, allowing a reference to the open-loop gain G3 of the RAM table 64. In the same manner, the zones Z2 and Z8 are regarded as symmetrical zones and the same pointer information P2 is stored in corresponding memory areas of the ROM table 62, allowing the open-loop gain G2 of the RAM table 64 to be referred to. Further, as to the zone Z1, its own open-loop gain G1 is stored in the RAM table 64. It is not necessary to perform an interpolating calculation for the zones Z4 and Z5 which present a characteristic having flat linear portions in the middle of FIG. 13A. The interpolating calculation is carried out only for non-linear portions including the zones Z1, Z2, Z3, Z6 and Z7. The zone Z8 is not a user area and hence the open-loop gain G1 for example is fixedly used. Since G1 is a fixed value, there is no need to perform a linear interpolation for this domain.

Although in the above embodiments the offset correction data were by way of example external offset correction data, position sensitivity correction data and biasing force correction data, the present invention is otherwise applicable intact to appropriate offset correction data corresponding to cylinder positions used in the disk unit.

Measurement of Position Sensitivity Correction Values

Figure 14:
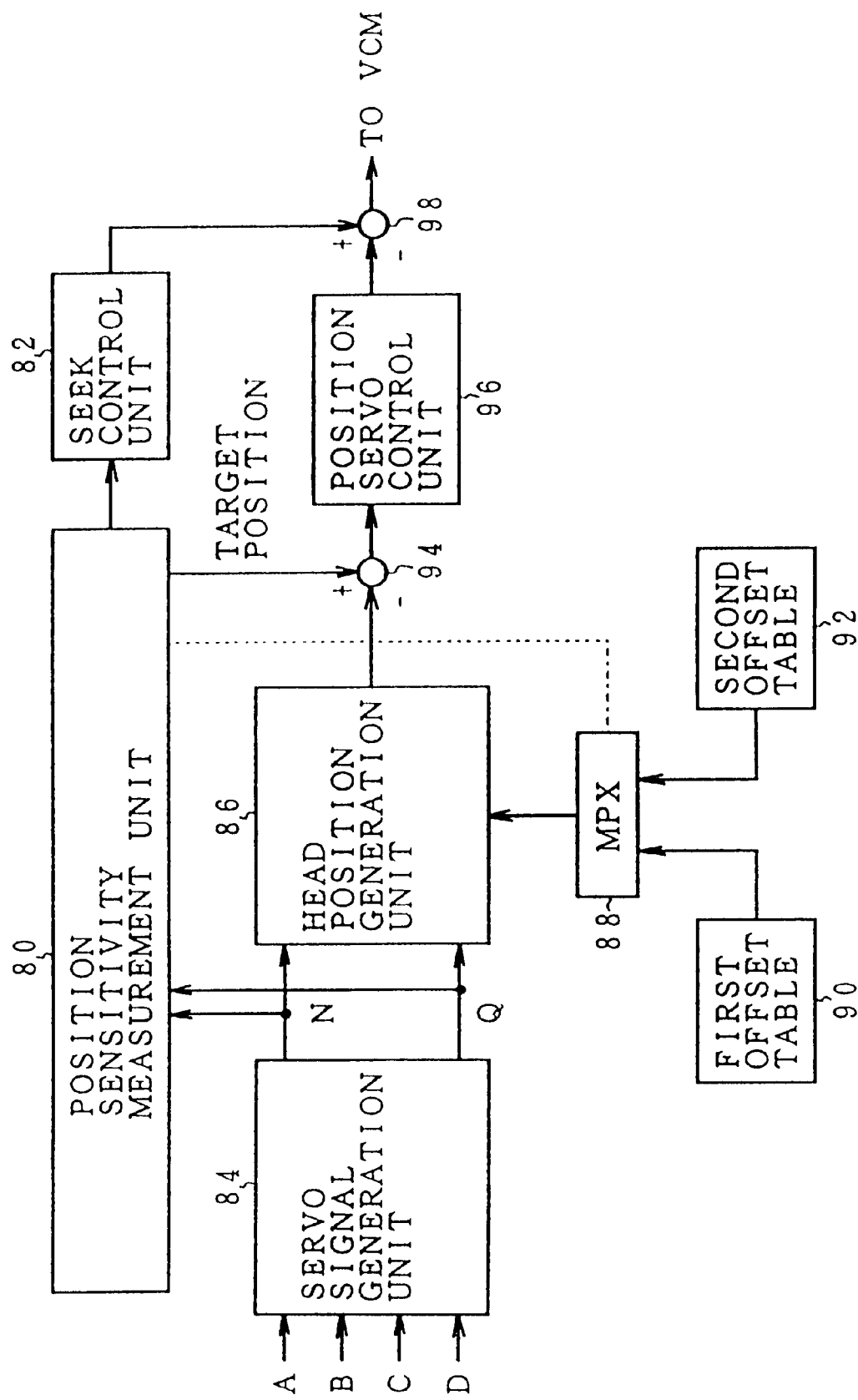
FIG. 14 is a functional block diagram showing position sensitivity measurement processing of the present invention.
Figure 15A:
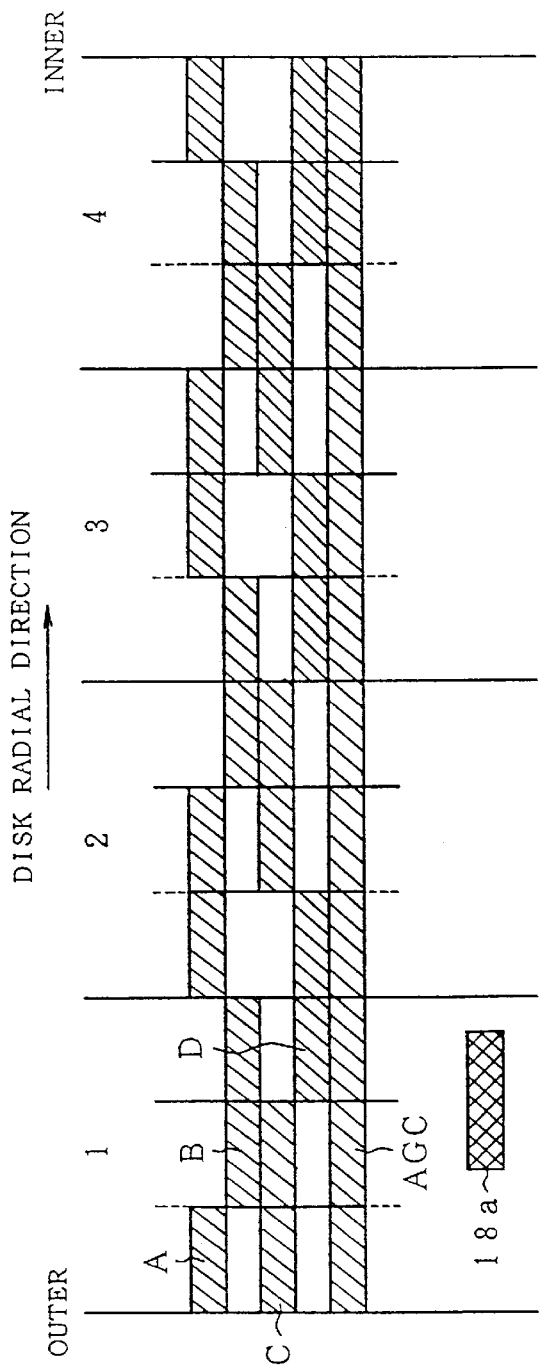
FIGS. 15A and FIG. 15B are explanatory diagrams showing two-phase servo patterns and demodulated two-phase servo signals.
Figure 15B:
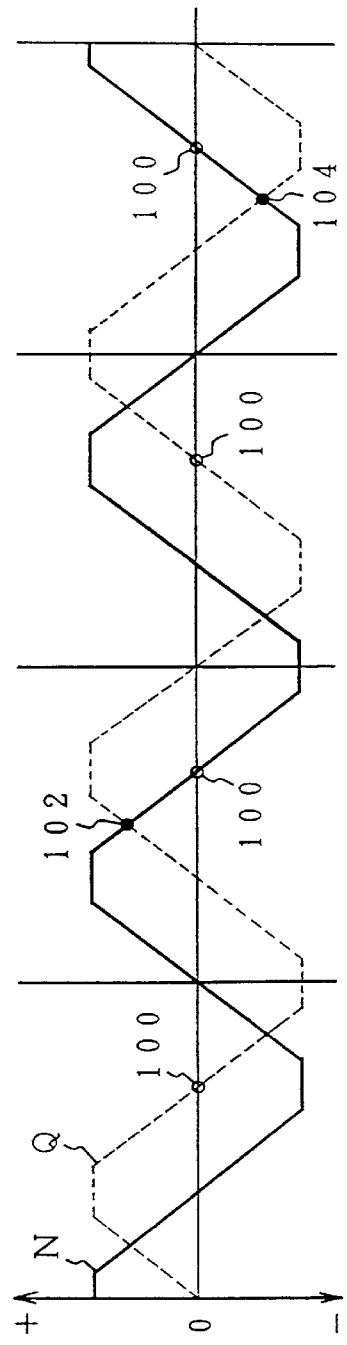

Referring to FIG. 14 there is depicted a block diagram illustrating a function for measuring position sensitivity correction values in a disk unit of the present invention. The position sensitivity measurement unit 80 is activated for example upon disk drive shipping or during the initialization process or at a desired calibration timing, and measures a position sensitivity correction value on the basis of two-phase servo signals N and Q derived from read signals of two-phase servo information recorded in sectors on a disk data surface. The disk medium is divided, in a radial direction of cylinders, into eight zones Z1 to Z8 as shown for example in FIG. 12A, and cylinder positions at zone boundaries are subjected to the measurement of the position sensitivity correction values. FIG. 15A illustrates a two-phase servo pattern on a magnetic disk for use in the measurement of position sensitivity correction values according to the present invention In FIG. 15A, a servo pattern of one servo frame is shown for cylinder numbers 1 to 4 with an axis of abscissas representing the radial direction of the disk and with an axis of ordinates representing the rotational direction of the disk (or the direction in which the tracks extend). Notice is taken of the cylinder number 1, in which the two-phase servo pattern includes four patterns A, B, C and D, with one track pitch being divided into three one-third track pitches to change the phase. More specifically, pattern A is first recorded in one-third track pitch width, and with a shift of one-third track pitch the pattern B is recorded in two-third track pitch width, and with one-third track pitch shift relative to the pattern A the pattern C is recorded in two-third track pitch width, and then with also one-third track pitch shift relative to the pattern B the pattern D is recorded in two-third pitch width. The last AGC pattern is continuously recorded in the radial direction of the disk. FIG. 15B illustrates two-phase servo signals N and Q obtained when an MR head 18*a* serving as a read head has been displaced for a seek at a fixed velocity in the disk radial direction relative to the two-phase servo patterns A to D whose phase varies at one-third track pitch of FIG. 15A. Herein, the servo signal N represents a difference between read signals of the patterns A and B, and the servo signal Q represents a difference between read signals of the patterns C and D. These relationships can be written as:

$$N=A-B$$

$$Q=C-D$$

A servo signal generation unit 84 shown in FIG. 14 performs a generation of such two-phase servo signals N and Q based on the two-phase servo patterns A to D read signals. With respect to the servo signals N and Q derived from two-phase servo signals whose phase varies at one-third track pitch, as shown in FIG. 15B, on-track positions upon a read/write operation result in zero-cross positions 100 of the servo signal Q indicated by circles in the cylinder numbers 1 to 4. On the contrary, in the position sensitivity correction value measurement processing of the present invention, an on-track control is provided for the head so as to ensure that the head is positioned at measurement positions 102 and 104 in the cylinder numbers 2 and 4, respectively, which are cross points between the servo signals N and Q. The position sensitivity correction value is thus found from signal values of the cross points obtained at that time. In the graph, the cross point measurement position 102 in the cylinder number 2 rests on its positive side, whereas the cross point measurement position 104 in the cylinder number 4 rests on its negative side. The measurement of the positive cross point and the negative cross point will thus ensure a relaxation of errors attributable to vertically asymmetric properties in read signals of the MR head 18. More specifically, a cross point measurement value is found from a mean value of the positive cross point measurement value obtained at the measurement position 102 and the absolute value of the negative cross point measurement value obtained at the measurement position 104 A cross point theoretical value is divided by the thus found measurement value to obtain a position sensitivity correction value.

Figure 16A:
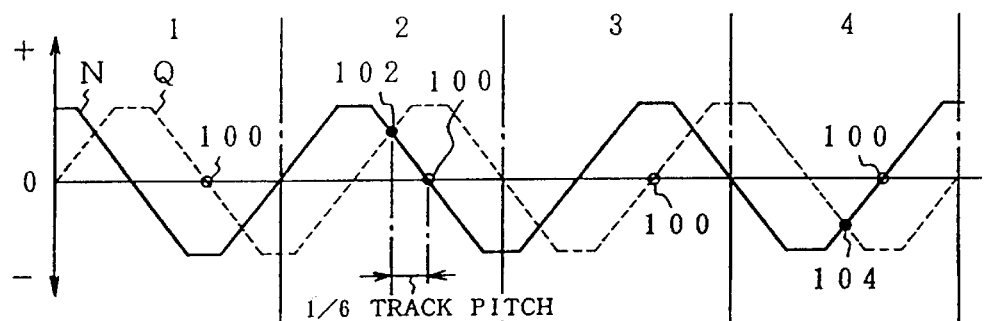
FIGS. 16A to 16C are explanatory diagrams respectively showing two-phase servo signals, head position signals, and a signal obtained by joining the head position signals together, at the time of position sensitivity measurement of FIG. 14.
Figure 16B:
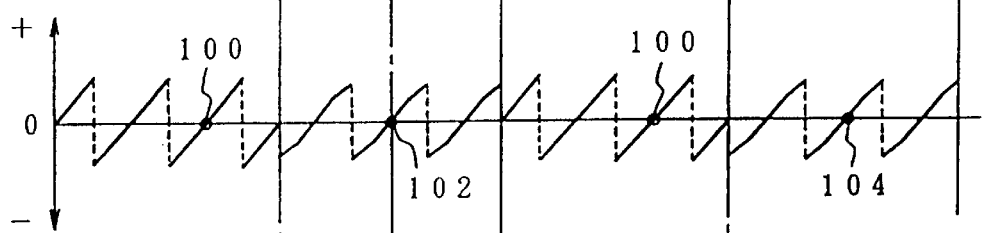
Figure 16C:
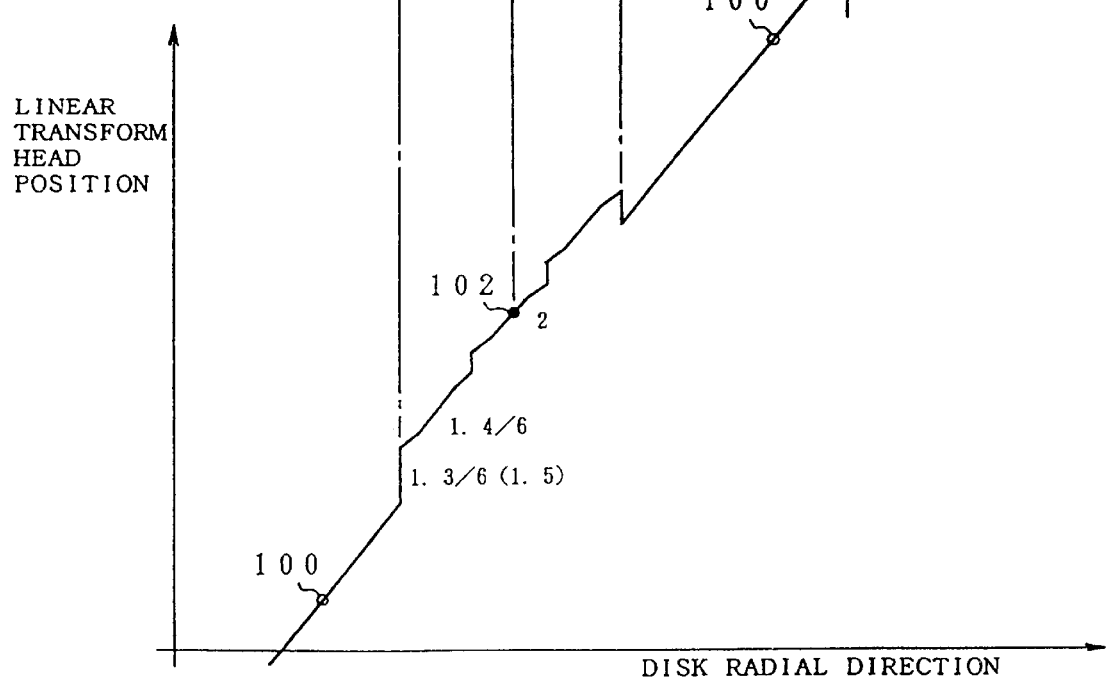

Referring to FIGS. 16A, 16B and 16C there are respectively depicted in graphic representation two-phase servo signals N and Q used for effecting an on-track control at a cross point, that is, a measurement position by means of FIG. 14 position sensitivity measurement unit 80, head position signals generated from the two-phase servo signals N and Q, and a signal obtained by continuously joining the head position signals together. FIG. 16A illustrates, in the same manner as FIG. 15B, the two-phase servo signals N and Q derived from signals which the MR head 18a has read from two-phase servo patterns A to D whose phase varies at one-third pitch of FIG. 15A. These two-phase servo signals N and Q are converted into head position signals which vary linearly from negative to positive, as seen in the cylinder numbers 1 and 3 of FIG. 16B, that is, unmeasured cylinders, allowing on-track positions 100 upon read/write operation to lie on the zero point on characteristic lines. In actual head position control, as seen in FIG. 16C, a predetermined offset is applied to the head position signals lying within one track pitch obtained in FIG. 16B to thereby acquire a continuously joined signal to be processed. It is however impossible to use the head position signals at ordinary on-track positions 100 to effect an on-track control at the measurement positions 102 and 104 where the two-phase servo signals N and Q cross as in the measurement cylinders 2 and 4. Thus, in the position sensitivity correction value measurement processing of the present invention, a conditional expression is provided which gives a head position signal from two-phase servo signals N and Q proper to the measurement cylinders 2 and 4 which contain the cross points 102 and 104, respectively.

Referring to FIG. 17 there are depicted conditions for two-phase servo signals N and Q which are intended to generate FIG. 16B head position signals to be used in the cylinders 2 and 4, and expressions for calculating head position signals on respective conditions. By applying arithmetic expressions in accordance with the conditions of FIG. 17 to the measurement cylinders 2 and 4 of FIG. 16A, a signal conversion will be accomplished through which respective head position signals at the cross point measurement positions 102 and 104 are allowed to rest on the -zero point. Each one-third track pitch signal curve of FIG. 16B obtained in the measurement cylinders 2 and 4 presents an angled line variation with 45-degree inclination at a zero-cross region and with a gentler inclination at both ends, since each curve has been calculated including flat areas of the two-phase servo signals N and Q in FIG. 16A. Further, the head position signals obtained in the measurement cylinders 2 and 4 are end-to-end joined together by use of offset values fulfilling conditions for two-phase servo signals N and Q defined in a first offset table 90 and a second offset table 92 of FIG. 18, to obtain a graph as shown in FIG. 16C. FIG. 16C illustrates a state in which the FIG. 16B head position signals are end-to-end joined together in the track pitch of the measurement cylinder 2 by using the first offset table 90 of FIG. 18. In this manner, for the measurement cylinders 2 and 4, use is made of arithmetic expressions in accordance with the conditions of FIG. 17 and offset values in accordance with FIG. 18, to thereby create head position signals allowing on-track control with the head position signals at the measurement positions 102 and 104, that is, at cross points resting on zero point.

A head position generation unit 86 of FIG. 14 generates head position signals of FIGS. 16A, 16B and 16C, through a multiplexer 88 using the offset values of the first offset table 90 for the measurement cylinder 2 and the offset values of the second offset table 92 for the measurement cylinder 4. An add point 94 receives a head position signal for use in the offset measurement, derived from the head position generation unit 86. A deviation is fetched which is a difference between the head position signal and a target position signal indicating a cross point measurement position given by the position sensitivity measurement unit 80. The deviation is then imparted to a position servo control unit 96, which allows a current to be supplied from an add point 98 to the VCM, thereby performing on-track control at the target position 102 or 104 defined by a cross point. In an on-track state at the zero-cross point which is a measurement position, the position sensitivity correction value measurement unit 80 measures a cross point value from values of two-phase servo signals N and Q, obtained at that time, from the servo signal generation unit 84, and when a positive cross point measurement value and a negative cross point measurement value have been obtained, figures out a mean value of a sum of the absolute values of the two, and divides a cross point theoretical value by the mean value to obtain a position sensitivity correction value. In the actual position sensitivity measurement, use is made of a mean value of measurement values of a plurality of cross points obtained in a measurement cylinder on-track state. Further, the position sensitivity measurement unit 80 directs a seek control unit 82 to perform a measurement cylinder position seek control. More specifically, in the position sensitivity measurement of the present invention, the cylinder positions are segmented into for example eight zones and a position sensitivity correction value is measured for each of cylinder positions at zone boundaries. Therefore, a zone boundary cylinder address is placed in the seek control unit 82 every position sensitivity measurement to effect a seek control, and after the completion of the seek control, the position servo control unit 96 carries out a measurement cylinder on-track control. As can be seen in FIG. 16A, after the completion of a positive side cross point measurement at a first measurement position 102 in the cylinder number 2, the seek control unit 82 is directed to execute a two-track seek to allow the head to be positioned on the measurement cylinder 4 having a next measurement position 104. Generation is then made of a head position signal required for the on-track at the cross point which defines a measurement position 104, which is followed by measurement processing.

Figure 19:
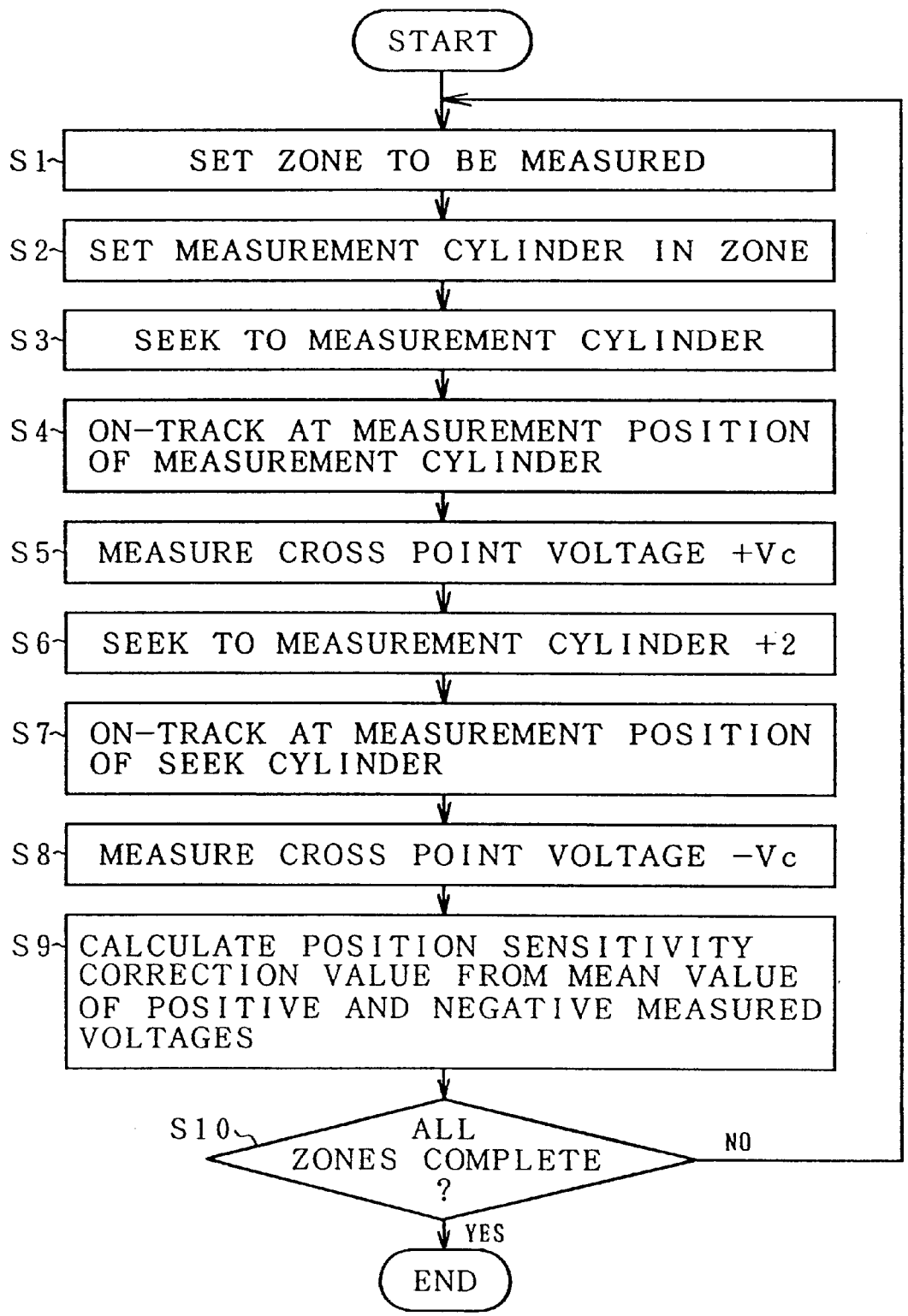
FIG. 19 is a flow chart showing position sensitivity measurement processing of FIG. 14.

Referring to FIG. 19 there is depicted a flow chart illustrating position sensitivity correction value measurement processing in FIG. 14. First in step S1 a measurement zone is set and then in step S2 a first measurement cylinder is set which defines a boundary position of the measurement zone. Then in step S3 a seek to the measurement cylinder is executed, and in step S4 an on-track control is effected at a measurement position which is defined by a cross point of the measurement cylinder, and in step S5 a voltage +Vc is measured at the cross point. Subsequently, the head is two track displaced to the next measurement cylinder in step S6 and is positioned at a zero-cross point of the seek measurement cylinder in step S7, and a voltage −Vc at the cross point is measured in step S8. Afterward, in step S9 a mean value is figured out of absolute values of the positive and negative measured voltages +Vc and −Vc, and a predetermined cross point theoretical value is divided by the mean value to calculate a position sensitivity correction value at that position, the result being stored into the table. It is then checked in step S10 whether or not the processing has been completed for all the zones. Thus, boundary cylinder positions in all zones are subjected to the same processing. In spite of such compressed recording of two-phase servo signal servo patterns into one-third track pitch phase variation, the on-track control allows the cross point to be measured to appear every second track to expand cross point intervals, thereby reducing cross point density to be measured and ensuring a shortened measurement time. Also, by virtue of a direct measurement of a cross point value with on-track at a position coincident with the cross point, the zero-cross point measurement precision will be remarkably improved, leading to a marked improvement in the measurement precision of the position sensitivity correction value obtained by use of this measurement result, as compared with the conventional case in which a cross-point value is figured out from a linear interpolation using values anterior and posterior to the cross point. Further, the measurement of the position sensitivity correction value is effected on a zone-by-zone basis and hence the increase in the number of the measurement points is suppressed in spite of the increase in the number of cylinders, with the remaining unmeasured areas being subjected to a linear interpolation, thus making it possible to simplify the position sensitivity measurement and to reduce the capacity of the RAM table for storing therein the position sensitivity correction values.

Encode Loss and Decode Loss

Figure 20:
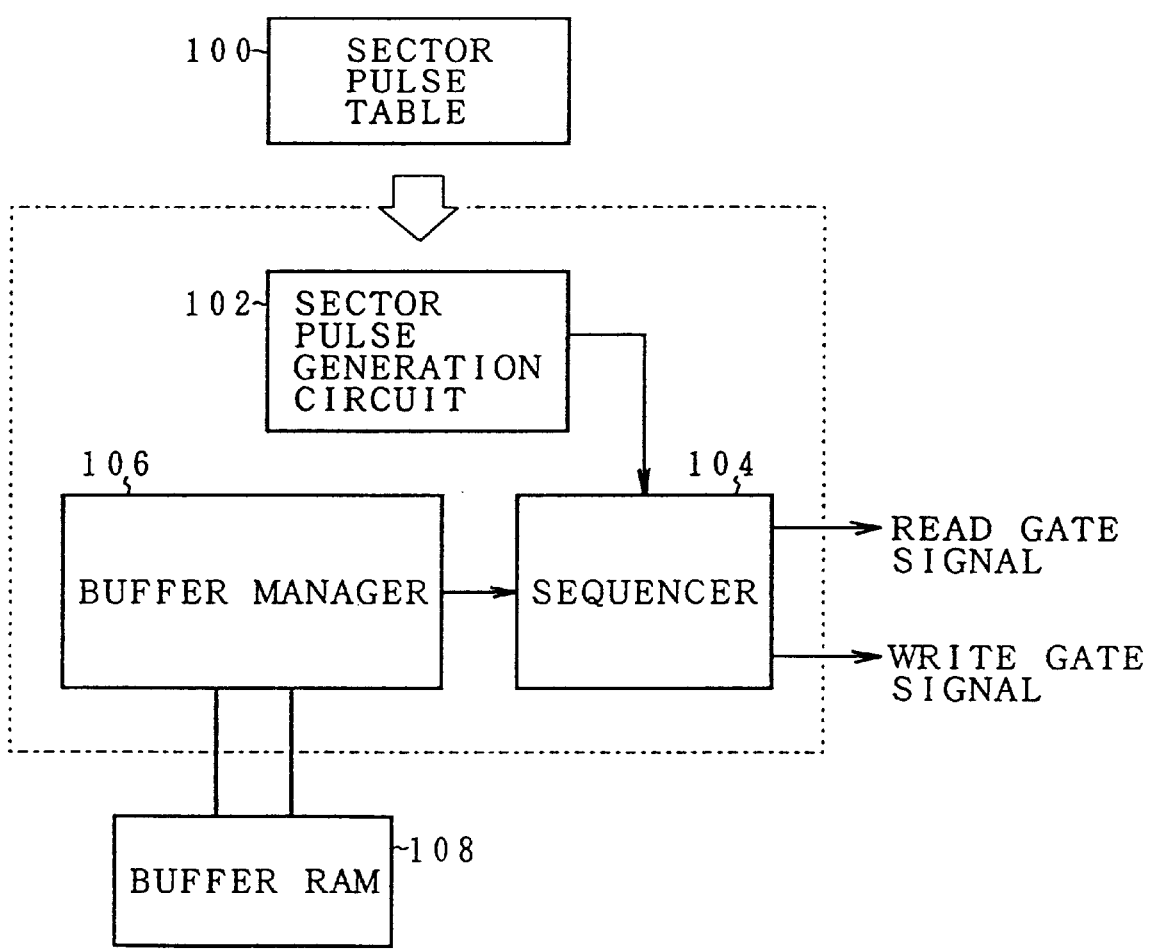
FIG. 20 is a block diagram of a read gate and write gate signal generating section for use in the present invention.

Referring to FIG. 20 there is depicted a block diagram illustrating a circuit area for generating a write gate signal and a read gate signal for use in the disk unit of the present invention. The disk unit of the present invention employs a data surface servo in which servo frames are recorded at predetermined intervals on tracks, with the region between the servo frames being divided into a plurality of sectors. For this reason, a sector mark is recorded at a leading position of each of the plurality of sectors following the servo frames, the sector mark being read to obtain a sector pulse. In the disk unit of the present invention shown in FIG. 1, the read/write unit 38 of the control unit 12 executes a partial response most likelihood (PRML) method based signal processing, that is, encode of NRZ data upon writing operation and decode from head read signal into NRZ data upon read operation, the encoding and decoding each giving rise to a loss of the order of 40 bits for example. To deal with such encode loss and decode loss, a prior art disk unit executes processing shown in a time chart of FIG. 21A. FIG. 21A illustrates a servo frame signal, a sector pulse, a write gate signal and a read gate signal. The servo frame signal is obtained by the detection of a servo frame. An interval between two servo frame signals is divided into four sectors in this conventional example, with sector marks being recorded at the leading positions of respective sectors to provide sector pulses designated at reference numerals 1, 2, 3 and 4.

The write signal occurs at the leading edge of a sector pulse following the servo frame signal during the writing operation and remains ON until the completion of one-sector input of NRZ signals for writing into the FIG. 1 read/write unit 38 in write mode. When the write gate signal turns off, it is followed immediately by a gap region corresponding to an encode loss time Tw upon the writing operation. The read gate signal, on the other hand, appears with a delay relative to the leading edge of the sector pulse, the delay corresponding to a decode loss time Tr which is taken from the rise of the sector pulse upon the reading operation to the time when the NRZ signals are provided as output to the hard disk controller 34 after the acquisition of the head read signal. The read gate signal remains ON during the one-sector read time. Referring again to the write gate signal, the gap region corresponding to the encode loss time Tw and appearing the instance the write gate signal turns off is immediately followed by a gap region corresponding to the decode loss time Tr which has occurred for the read gate signal. In other words, the conventional sector servo format is provided with a gap region corresponding to a loss time To (=Tw+Tr) and immediately following the trailing edge of the write gate signal, the loss time To being a sum of the encode loss time Tw upon the writing operation and the decode loss time Tr upon the reading operation. This will result in a lower format efficiency since a gap region must be secured in the sector area, the gap region corresponding to a loss equal to a sum of the encode loss and the decode loss.

Referring to FIG. 21B there is depicted a time chart of the present invention, in write operation, of a servo frame signal, a sector pulse and a write gate signal. As is apparent from the chart, in a disk medium sector format of the present invention, a gap region following the trailing edge of an active write signal includes only the encode loss time Tw in write operation. In contrast to the sector format having a gap region at each sector trailing position corresponding to the encode loss time Tw in write operation, the sector format in read operation as shown in FIG. 21C allows sector pulses to be detected with a delay after the fall of the servo frame signal, the delay corresponding to the encode loss time Tr in read operation, and allows read gate signal to occur in synchronism with the rise of the delayed sector pulse. Such a delay of the sector pulse in read operation corresponding to the decode loss Tr would eliminate a need to provide a gap region including both the encode loss time Tw and the decode loss time Tr at the trailing positions of the sector format as in FIG. 21B. The absence of the gap region for the decode loss time Tr will contribute to enhancement of the format efficiency of the disk medium. Although the prior art format includes for example four sectors between two servo frame signals as seen in FIG. 21A, the invention format of FIG. 21B will realize 2 to 3% increase in the sector regions.

Description will now be given of an action of the circuit area of FIG. 20. In write operation, a sector generation circuit 102 is loaded with a sector pulse table 100 allowing for the encode loss, and a sequencer 104 is activated by a sector pulse, making a write gate signal active. Subsequently, when a buffer manager 106 recognizes that a buffer RAM 108 has issued data up to the gap region corresponding to the encode loss, the sequencer 104 interrupts the write gate signal. This procedure is repeated for each of sector pulses. In read operation, the sector generation circuit 102 is loaded with another sector pulse table 100 allowing for the decode loss, and the sequencer 104 is activated by a sector pulse, making a read gate signal active. Subsequently, when the buffer manager 106 recognizes that the buffer RAM 108 has received necessary data, the sequencer 104 interrupts the gate read signal. In this case, the sector pulse tables 100 used in write and read operations each hold on its program predetermined values for each of the zones, so as to allow the values corresponding to the current zone to be set.

Although FIG. 10 embodiment employs by way of example a data surface servo using a data surface having servo frames recorded thereon at predetermined intervals, data surface sector format of the present invention is applicable similarly to a servo surface servo using an exclusive servo information record surface.

According to the present invention as set forth hereinabove, the connection surfaces including connection patterns at confronting ends of the base-side read/write FPC and of the relay FPC in the head actuator are allowed to lie within the same fitting plane, thereby enabling design positioning dimensions to coincide with actual positioning dimensions upon assembling, and ensuring an easily improved positioning accuracy.

The read/write FPC band together with the retainer is received within a recessed step formed in the FPC mounting surface of the actuator, thereby ensuring a stable mounting of the read/write FPC onto the head actuator The pointer information in the ROM table allows an arbitrary designation of a storage position in the RAM table which has stored correction data therein, thereby enabling the correction intervals to be varied and minimizing the use area of the RAM.

In spite of compressive recording of the two-phase servo signal servo patterns into a one-third track pitch phase variation, the on-track control allows the cross points to be measured to appear every other track, thus resulting in an expanded cross point intervals, contributing to a reduction in the density of cross points to be measured and to a reduction in the measurement time.

According to the present invention, a gap region corresponding to only the encode loss in write operation will suffice for the gap region to be provided at the trailing position of each sector on tracks. Thus, as compared with the conventional case of providing a gap region corresponding to the sum of the encode loss and decode loss, lowering of format efficiency can be improved with the increased disk capacity.

What is claimed is:

1. A disk unit intended to record a sector mark at a leading position of each of a plurality of sectors which are obtained by recording servo frames at prescribed intervals on tracks of a disk medium and dividing an interval between said servo frames and upon read operation or write operation relative to the disk medium, generate a write gate signal or a read gate signal on the basis of a sector pulse derived from a read of the sector mark, said disk unit comprising:

a gap region provided at a trailing position of each sector of the disk medium and having a duration corresponding to an encode loss attributable to a write operation;

a write gate generation unit for generating in a write operation, a write gate signal in synchronism with the sector pulse, and interrupting the write gate signal in response to a detection signal of said gap region; and a read gate generation unit for generating, in read operations read gate signal in synchronism with the sector pulse with a delay of time corresponding to decode loss attributable to a read operation, and interrupting the read gate signal in response to a signal which is obtained by delaying said detection signal of said gap region by said time corresponding to the decode loss.

2. A disk unit according to claim 1, wherein said gap region having a duration corresponding to encode loss and said delay time corresponding to decode loss are each set to a value depending on a cylinder position of a head.

* * * * *

UNITED STATES PATENT AND TRADEMARK OFFICE
CERTIFICATE OF CORRECTION

PATENT NO. : 6,172,838 B1  
DATED : January 9, 2001  
INVENTOR(S) : Ohba

Page 1 of 1

It is certified that error appears in the above-identified patent and that said Letters Patent is hereby corrected as shown below:

Column 18,  
Line 34, insert -- , -- between "generating and "in".  
Line 39, insert -- , a -- between "operations" and "read".

Signed and Sealed this

Twenty-ninth Day of January, 2002

Attest:

JAMES E. ROGAN  
Attesting Officer  Director of the United States Patent and Trademark Office